US011947310B2

(12) United States Patent
Wang et al.

(10) Patent No.: US 11,947,310 B2
(45) Date of Patent: Apr. 2, 2024

(54) DEVELOPING CARTRIDGE INCLUDING FIRST AND SECOND INCLINED SURFACES, ELASTIC MEMBER, AND FIRST PROTRUSION

(71) Applicant: BROTHER KOGYO KABUSHIKI KAISHA, Nagoya (JP)

(72) Inventors: Yuwen Wang, Nagoya (JP); Junichi Hashimoto, Toyohashi (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/147,819

(22) Filed: Dec. 29, 2022

(65) Prior Publication Data

US 2023/0134221 A1 May 4, 2023

Related U.S. Application Data

(63) Continuation of application No. 17/476,872, filed on Sep. 16, 2021, now Pat. No. 11,550,256, which is a (Continued)

(30) Foreign Application Priority Data

Sep. 28, 2018 (JP) ................................ 2018-185275

(51) Int. Cl.
*G03G 15/04* (2006.01)
*G03G 21/16* (2006.01)
*G03G 21/18* (2006.01)

(52) U.S. Cl.
CPC ..... *G03G 21/1814* (2013.01); *G03G 21/1642* (2013.01); *G03G 21/1671* (2013.01); *G03G 21/1821* (2013.01)

(58) Field of Classification Search
CPC ............... G03G 15/04; G03G 21/1642; G03G 21/1671; G03G 21/1814; G03G 21/1821
(Continued)

(56) References Cited

U.S. PATENT DOCUMENTS 7,693,443 B2 4/2010 Sato et al.
7,756,443 B2 7/2010 Okabe et al.
(Continued)

FOREIGN PATENT DOCUMENTS

CN 101236387 A 8/2008
CN 105824213 * 8/2016
(Continued)

OTHER PUBLICATIONS

Office Action (Notice of Reasons for Refusal) issued in corresponding Japanese Patent Application No. 2018-185275, dated Aug. 17, 2022.

*Primary Examiner* — Hoan H Tran
(74) *Attorney, Agent, or Firm* — Merchant & Gould P.C.

(57) ABSTRACT

A developing cartridge includes: a casing; a developing roller; a shaft extending in a first direction; a first inclined surface; a second inclined surface; an elastic member; and a first protrusion. The shaft is movable in the first direction relative to the casing and the developing roller, and is movable in the second direction together with the same. The first inclined surface is positioned at one end portion of the shaft, while the second inclined surface is positioned at another end portion of the shaft. The first and second inclined surfaces are inclined relative to the first direction. The first protrusion is movable in the first direction together with the second inclined surface. The shaft is movable from a first position to a second position when the second inclined surface receives a pressing force directed in a direction from the another end portion to the one end portion.

18 Claims, 26 Drawing Sheets

Related U.S. Application Data continuation of application No. 16/901,337, filed on Jun. 15, 2020, now Pat. No. 11,126,139, which is a continuation of application No. 16/562,000, filed on Sep. 5, 2019, now Pat. No. 10,719,051.

(58) Field of Classification Search
USPC .................................. 399/107, 110, 111, 119
See application file for complete search history.

(56) References Cited

U.S. PATENT DOCUMENTS

| | | | | |
|---|---|---|---|---|
| 8,412,070 | B2 | 4/2013 | Kikuchi et al. | |
| 8,995,866 | B2 | 3/2015 | Itabashi et al. | |
| 9,625,875 | B2 * | 4/2017 | Handa ................ | G03G 21/1676 |
| 9,864,330 | B2 | 1/2018 | Hashimoto et al. | |
| 10,719,051 | B2 | 7/2020 | Wang et al. | |
| 2011/0064457 | A1 | 3/2011 | Okabe et al. | |
| 2013/0051849 | A1 | 2/2013 | Itabashi et al. | |

FOREIGN PATENT DOCUMENTS

| | | | |
|---|---|---|---|
| JP | 63-118172 | A | 5/1988 |
| JP | 2004-125954 | A | 4/2004 |
| JP | 2009-122391 | A | 6/2009 |
| JP | 2011-59510 | A | 3/2011 |
| JP | 2013-54058 | A | 3/2013 |
| JP | 2013-200493 | A | 10/2013 |

* cited by examiner

DEVELOPING CARTRIDGE INCLUDING FIRST AND SECOND INCLINED SURFACES, ELASTIC MEMBER, AND FIRST PROTRUSION

REFERENCE TO RELATED APPLICATIONS

This application is a continuation of U.S. patent application Ser. No. 17/476,872, filed Sep. 16, 2021, which is a continuation of U.S. patent application Ser. No. 16/901,337, filed Jun. 15, 2020, now U.S. Pat. No. 11,126,139, which is a continuation of U.S. patent application Ser. No. 16/562,000, filed Sep. 5, 2019, now U.S. Pat. No. 10,719,051, which claims priority from Japanese Patent Application No. 2018-185275 filed Sep. 28, 2018. The entire contents of the aforementioned applications are incorporated herein by reference.

BACKGROUND ART

Technical Field

The present disclosure relates to a developing cartridge.

Background

An electro-photographic type image forming apparatus such as a laser printer and an LED printer is well known in the art. A developing cartridge is used for the image forming apparatus. The developing cartridge includes a developing roller for supplying toner. The conventional image forming apparatuses are described in the prior art. An image forming apparatus described in the prior art includes a drawer unit. The drawer unit includes a photosensitive drum. The developing cartridge is attachable to the drawer unit. When the developing cartridge is attached to the drawer unit, the developing roller contacts the photosensitive drum.

A developing cartridge disclosed in another prior art is attachable to a drum cartridge. The drum cartridge includes a photosensitive drum. When the developing cartridge is attached to the drum cartridge, the developing roller contacts the photosensitive drum. Then, the drum cartridge to which the developing cartridge has been attached is attached to a main casing of an image forming apparatus.

DESCRIPTION

Summary

The image forming apparatuses disclosed in the prior arts are switchable between a state in which the developing roller and the photosensitive drum are in contact with each other, and a state in which the developing roller and the photosensitive drum are separated from each other. In the prior arts, a component for moving the developing cartridge to separate the developing roller from the photosensitive drum is provided on both ends of the drawer unit or the drum cartridge, and both components for moving the developing cartridge are required to receive driving force from a main body of the image forming apparatus.

In view of the foregoing, it is an object of the present disclosure to provide a developing cartridge capable of moving relative to a photosensitive drum of the drawer by driving force acting on only one end of the developing cartridge, not by driving force acting on both ends of the developing cartridge.

In order to attain the above and other objects, the disclosure provides a developing cartridge including: a casing; a developing roller; a shaft; a first inclined surface; a second inclined surface; an elastic member; and a first protrusion. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction. The first inclined surface is positioned at the one end portion in the first direction of the shaft and is movable together with the shaft. The first inclined surface is inclined relative to the first direction such that a distance between the shaft and the first inclined surface in a radial direction of the shaft increases in a direction from the one end portion in the first direction of the shaft to the another end portion in the first direction of the shaft. The radial direction of the shaft is the second direction. The second inclined surface is positioned at the another end portion in the first direction of the shaft and is movable together with the shaft. The second inclined surface is inclined relative to the first direction such that a distance between the shaft and the second inclined surface in the radial direction of the shaft increases in the direction from the one end portion in the first direction of the shaft to the another end portion in the first direction of the shaft. The elastic member is configured to expand and contract in the first direction. The elastic member has one end and another end in the first direction. The one end in the first direction of the elastic member is connected to the second inclined surface. The another end in the first direction of the elastic member is connected to the casing. The first protrusion is positioned at the another end portion in the first direction of the shaft. The first protrusion is movable in the first direction together with the second inclined surface relative to the casing. The first protrusion is positioned closer to the developing roller than the second inclined surface is to the developing roller. The shaft is movable from a first position to a second position in response to the second inclined surface receiving a pressing force directed in a direction from the another end portion in the first direction of the shaft to the one end portion in the first direction of the shaft.

According to another aspect, the disclosure provides a developing cartridge including: a casing; a developing roller; a shaft; and a first inclined surface. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction and has a peripheral surface. The first inclined surface is positioned at the one end portion in the first direction of the shaft and is movable together with the shaft. The first inclined surface is inclined relative to the first direction such that a distance between the shaft and the first inclined surface in a radial direction of the shaft increases in a direction from the one end portion in the first direction of the shaft to the another end portion in the first direction of the shaft. The radial direction of the shaft is the second direction. The first inclined surface is positioned at only a portion of the peripheral surface of the shaft.

According to still another aspect, the disclosure provides a developing cartridge including: a casing; a developing roller; a shaft; a first inclined surface; and a second inclined surface. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction and has a peripheral surface. The first inclined surface is positioned at the one end portion in the first direction of the shaft and is movable together with the shaft. The first inclined surface is inclined relative to the first direction such that a distance between the shaft and the first inclined surface in a radial direction of the shaft increases in a direction from the one end portion in the first direction of the shaft to the another end portion in the first direction of the shaft. The radial direction of the shaft is the second direction. The second inclined surface is positioned at the another end portion in the first direction of the shaft and is movable together with the shaft. The second inclined surface is inclined relative to the first direction such that a distance between the shaft and the second inclined surface in the radial direction of the shaft increases in the direction from the one end portion in the first direction of the shaft to the another end portion in the first direction of the shaft. The second inclined surface is positioned at only a portion of the peripheral surface of the shaft.

According to still another aspect, the disclosure provides a developing cartridge including: a developing cartridge including: a casing; a developing roller; a shaft; a first inclined surface; a second inclined surface; an elastic member; and a first protrusion. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction. The first inclined surface is positioned at the one end portion in the first direction of the shaft and is movable together with the shaft. The first inclined surface is inclined relative to the first direction such that the first inclined surface extends radially outward of the shaft in a direction from the one end portion in the first direction of the shaft to the another end portion in the first direction of the shaft. The second inclined surface is positioned at the another end portion in the first direction of the shaft and is movable together with the shaft. The second inclined surface is inclined relative to the first direction such that the second inclined surface extends radially outward of the shaft in the direction from the one end portion in the first direction of the shaft to the another end portion in the first direction of the shaft. The elastic member is configured to expand and contract in the first direction. The elastic member has one end and another end in the first direction. The one end in the first direction of the elastic member is connected to the second inclined surface. The another end in the first direction of the elastic member is connected to the casing. The first protrusion is positioned at the another end portion in the first direction of the shaft. The first protrusion is movable in the first direction together with the second inclined surface relative to the casing. The first protrusion is positioned closer to the developing roller than the second inclined surface is to the developing roller. The shaft is movable from a first position to a second position in response to the second inclined surface receiving a pressing force directed in a direction from the another end portion in the first direction of the shaft to the one end portion in the first direction of the shaft.

According to still another aspect, the disclosure provides a developing cartridge comprising: a casing; a developing roller; a shaft; and a first inclined surface. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction and has a peripheral surface. The first inclined surface is positioned at the one end portion in the first direction of the shaft and is movable together with the shaft. The first inclined surface is inclined relative to the first direction such that the first inclined surface extends radially outward of the shaft in a direction from the one end portion in the first direction of the shaft to the another end portion in the first direction of the shaft. The first inclined surface is positioned at only a portion of the peripheral surface of the shaft.

According to still another aspect, the disclosure provides a developing cartridge comprising: a casing; a developing roller; a shaft; a first inclined surface; and a second inclined surface. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction and has a peripheral surface. The first inclined surface is positioned at the one end portion in the first direction of the shaft and is movable together with the shaft. The first inclined surface is inclined relative to the first direction such that the first inclined surface extends radially outward of the shaft in a direction from the one end portion in the first direction of the shaft to the another end portion in the first direction of the shaft. The second inclined surface is positioned at the another end portion in the first direction of the shaft and is movable together with the shaft. The second inclined surface is inclined relative to the first direction such that the second inclined surface extends radially outward of the shaft in the direction from the one end portion in the first direction of the shaft to the another end portion in the first direction of the shaft. The second inclined surface is positioned at only a portion of the peripheral surface of the shaft.

According to still another aspect, the disclosure provides a developing cartridge including: a casing; a developing roller; a shaft; a first inclined surface; a second inclined surface; an elastic member; and a first protrusion. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction. The first inclined surface is positioned at the one end portion in the first direction of the shaft and is movable together with the shaft. The first inclined surface is inclined relative to the first direction such that a distance between the first inclined surface and the developing roller in the second direction increases in a direction away from the casing in the first direction. The second inclined surface is positioned at the another end portion in the first direction of the shaft and is movable together with the shaft. The second inclined surface is inclined relative to the first direction such that a distance between the second inclined surface and the developing roller in the second direction increases in a direction away from the casing in the first direction. The elastic member is configured to expand and contract in the first direction. The elastic member has one end and another end in the first direction. The one end in the first direction of the elastic member is connected to the second inclined surface. The another end in the first direction of the elastic member is connected to the casing. The first protrusion is positioned at the another end portion in the first direction of the shaft. The first protrusion is movable in the first direction together with the second inclined surface relative to the casing. The first protrusion is positioned closer to the developing roller than the second inclined surface is to the developing roller. The shaft is movable from a first position to a second position in response to the second inclined surface receiving a pressing force directed in a direction from the another end portion in the first direction of the shaft to the one end portion in the first direction of the shaft.

According to still another aspect, the disclosure provides a developing cartridge including: a casing; a developing roller; a shaft; and a first inclined surface. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction and has a peripheral surface. The first inclined surface is positioned at the one end portion in the first direction of the shaft and is movable together with the shaft. The first inclined surface is inclined relative to the first direction such that a distance between the first inclined surface and the developing roller in the second direction increases in a direction away from the casing in the first direction. The first inclined surface is positioned at only a portion of the peripheral surface of the shaft.

According to still another aspect, the disclosure provides a developing cartridge including: a casing; a developing roller; a shaft; a first inclined surface; and a second inclined surface. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction and has a peripheral surface. The first inclined surface is positioned at the one end portion in the first direction of the shaft and is movable together with the shaft. The first inclined surface is inclined relative to the first direction such that a distance between the first inclined surface and the developing roller in the second direction increases in a direction away from the casing in the first direction. The second inclined surface is positioned at the another end portion in the first direction of the shaft and is movable together with the shaft. The second inclined surface is inclined relative to the first direction such that a distance between the second inclined surface and the developing roller in the second direction increases in a direction away from the casing in the first direction. The second inclined surface is positioned at only a portion of the peripheral surface of the shaft.

According to still another aspect, the disclosure provides a developing cartridge for use with a drum cartridge including a photosensitive drum. The developing cartridge includes: a casing; a developing roller; a shaft; a first cam; a second cam; and an elastic member. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction. The first cam is positioned at the one end portion in the first direction of the shaft and is movable together with the shaft. The second cam is positioned at the another end portion in the first direction of the shaft and is movable together with the shaft. The second cam includes a first protrusion movable in the first direction relative to the casing. The first protrusion is positioned closer to the developing roller than the shaft is to the developing roller. The elastic member has one end and another end in the first direction. The one end in the first direction of the elastic member is connected to the second cam. The another end in the first direction of the elastic member is connected to the casing. The first cam and the second cam are configured to move the shaft and the casing in the second direction relative to the photosensitive drum in response to moving in the first direction together with the shaft. The shaft is movable from a first position to a second position in response to the second cam receiving a pressing force directed in a direction from the another end portion in the first direction of the shaft to the one end portion in the first direction of the shaft.

According to still another aspect, the disclosure provides a developing cartridge for use with a drum cartridge including a photosensitive drum. The developing cartridge includes: a casing; a developing roller; a shaft; and a first cam. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction and has a peripheral surface. The first cam is positioned at the one end portion in the first direction of the shaft and is movable together with the shaft. The first cam has a first inclined surface inclined relative to the first direction such that a distance between the shaft and the first inclined surface in a radial direction of the shaft increases in a direction from the one end portion in the first direction of the shaft to the another end portion in the first direction of the shaft. The first inclined surface is positioned at only a portion of the peripheral surface of the shaft.

According to still another aspect, the disclosure provides a developing cartridge for use with a drum cartridge including a photosensitive drum. The developing cartridge includes: a casing; a developing roller; a shaft; a first cam; a second cam. The casing is configured to accommodate developer therein. The developing roller is rotatable about a first axis extending in a first direction. The developing roller has an outer circumferential surface including one end portion and another end portion in a second direction. The one end portion is exposed to an outside of the casing. The another end portion is positioned inside the casing. The shaft extends along a second axis extending in the first direction. The shaft is movable in the first direction relative to the casing and the developing roller. The shaft is movable in the second direction together with the casing and the developing roller. The shaft has one end portion and another end portion in the first direction and has a peripheral surface. The first cam is positioned at the one end portion in the first direction of the shaft and is movable together with the shaft. The second cam is positioned at the another end portion in the first direction of the shaft and is movable together with the shaft. The second cam has a second inclined surface inclined relative to the first direction such that a distance between the shaft and the second inclined surface in a radial direction of the shaft decreases in a direction from the another end portion in the first direction of the shaft to the one end portion in the first direction of the shaft. The second inclined surface is positioned at only a portion of the peripheral surface of the shaft.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

1. First Embodiment

Hereinafter, a first embodiment of the present disclosure will be described with reference to the accompanying drawings.

<1.1. Configuration of Image Forming Apparatus>

Figure 1:
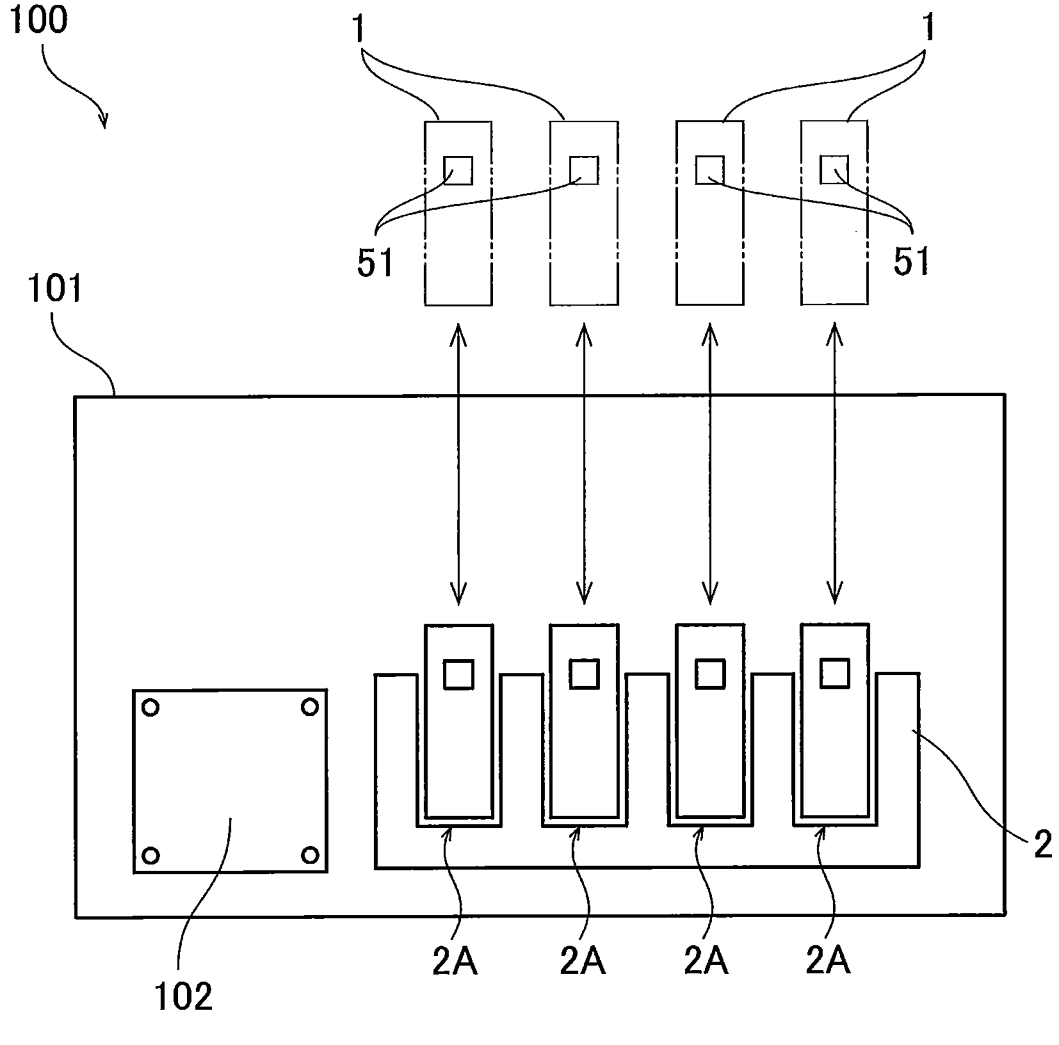
FIG. 1 is a schematic diagram of an image forming apparatus including a developing cartridge according to a first embodiment of the present disclosure.

FIG. 1 is a schematic diagram of an image forming apparatus 100. The image forming apparatus 100 is an electro-photographic type printer. For example, the image forming apparatus 100 may be a laser printer or an LED printer.

The image forming apparatus 100 includes four developing cartridges 1, a drawer 2, a main frame 101, and a controller 102.

The developing cartridges 1 are attachable to the drawer 2. That is, the developing cartridges 1 are for use with the drawer 2. The drawer 2 is a drum cartridge to which the four developing cartridges 1 are attachable, and includes four slots 2A. The four developing cartridges 1 are attachable to the corresponding slots 2A. The developing cartridges 1 are attachable to the main frame 101 in a state where the developing cartridges 1 are attached to the corresponding slots 2A. That is, the drawer 2 is detachably attachable to the main frame 101 in a state where the developing cartridges 1 are attached to the corresponding slots 2A. The four developing cartridges 1 accommodate developers (such as toner) of colors different from each other (such as cyan, magenta, yellow, and black). The plurality of developing cartridges 1, however, may accommodate developers of the same color. The number of the developing cartridges 1 attachable to the drawer 2 may be one, two, or three, or five or more.

The image forming apparatus 100 is configured to form images on printing papers using the developers supplied from the four developing cartridges 1.

Each of the four developing cartridges 1 includes an IC chip 51. The IC chip 51 is a storage medium from which information is readable and to which information is writable. The storage medium may be a flash ROM or an EEPROM, for example. When the developing cartridges 1 attached to the slots 2A of the drawer 2 are attached to the main frame 101, the IC chips 51 of the developing cartridges 1 and the controller 102 are electrically connected to each other. The controller 102 is configured of, for example, a circuit board. The controller 102 includes a processor such as a CPU, and various memories. The controller 102 is configured to execute various types of processing in the image forming apparatus 100 by operating the processor in accordance with programs.

<1.2. Developing Cartridge>

Figure 2:
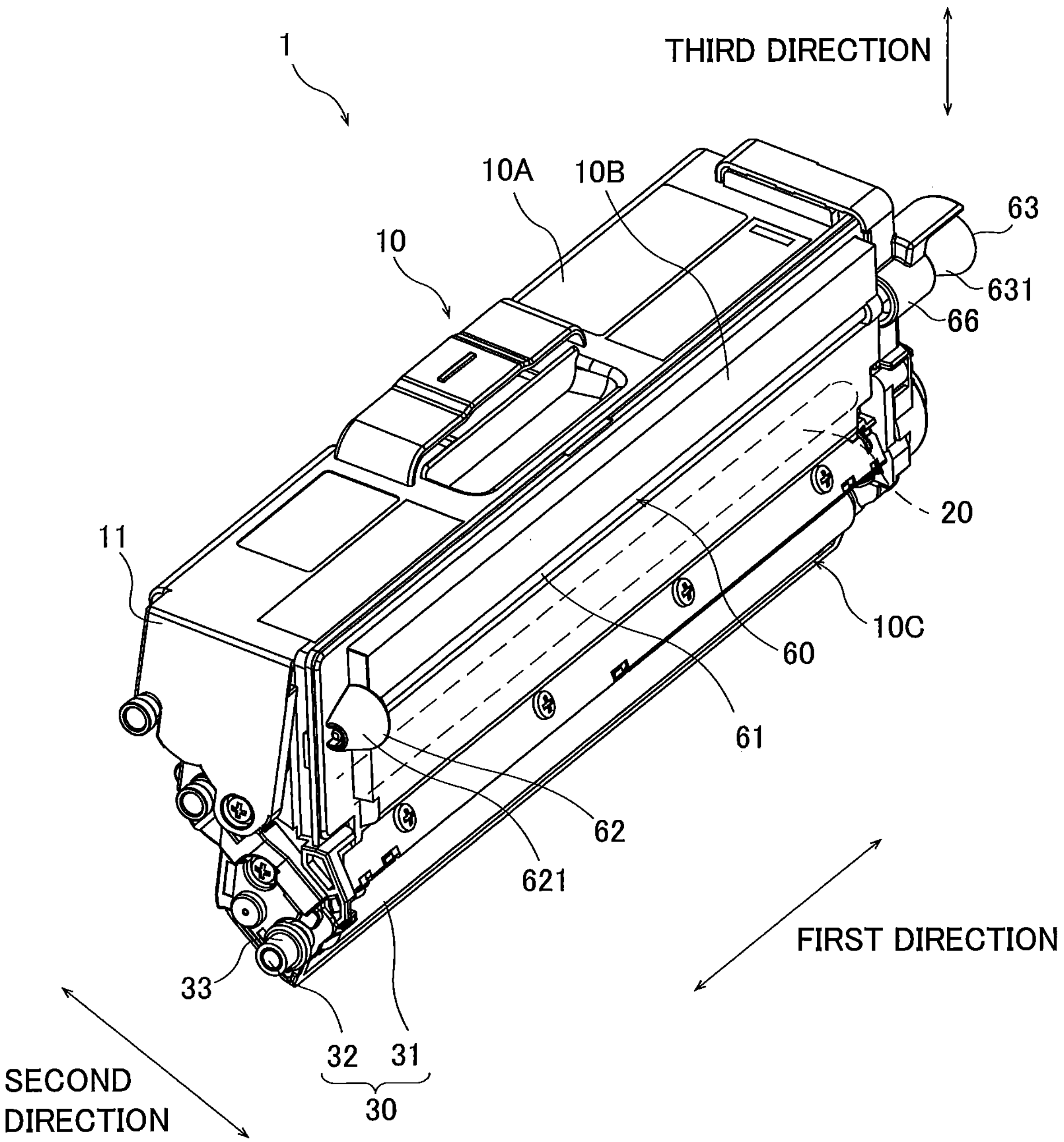
FIG. 2 is a perspective view of the developing cartridge according to the first embodiment.
Figure 3:
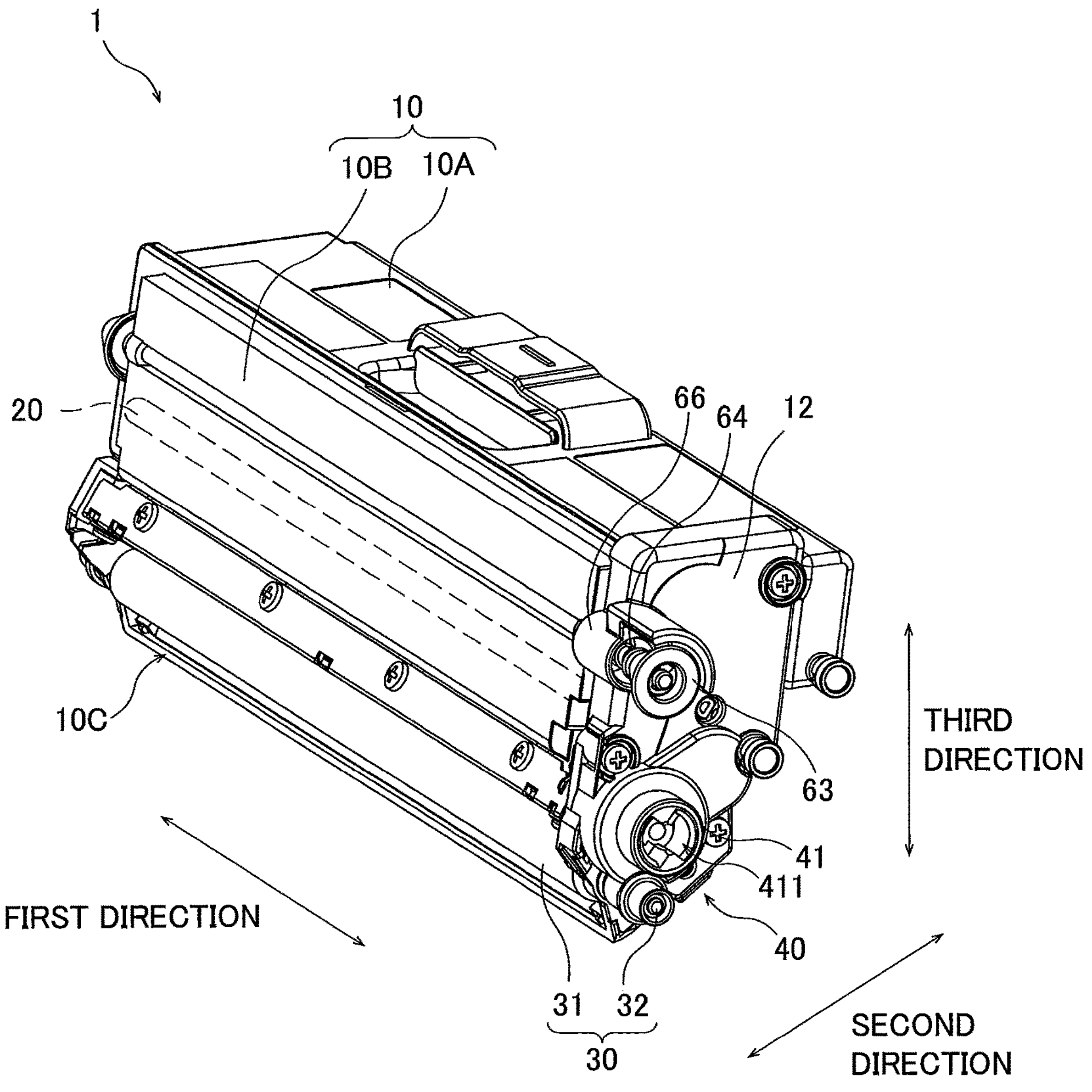
FIG. 3 is another perspective view of the developing cartridge according to the first embodiment.
Figure 4:
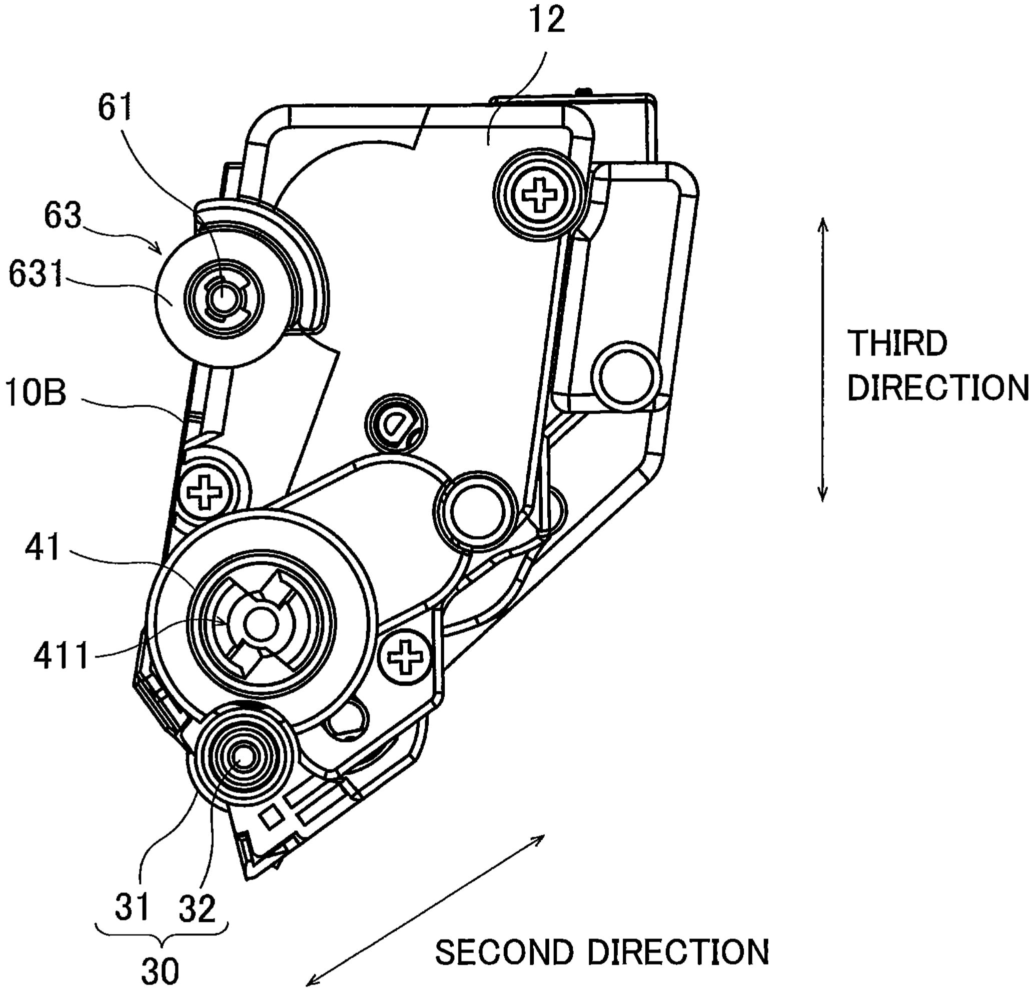
FIG. 4 is a plan view of the developing cartridge according to the first embodiment as viewed in a first direction.
Figure 5:
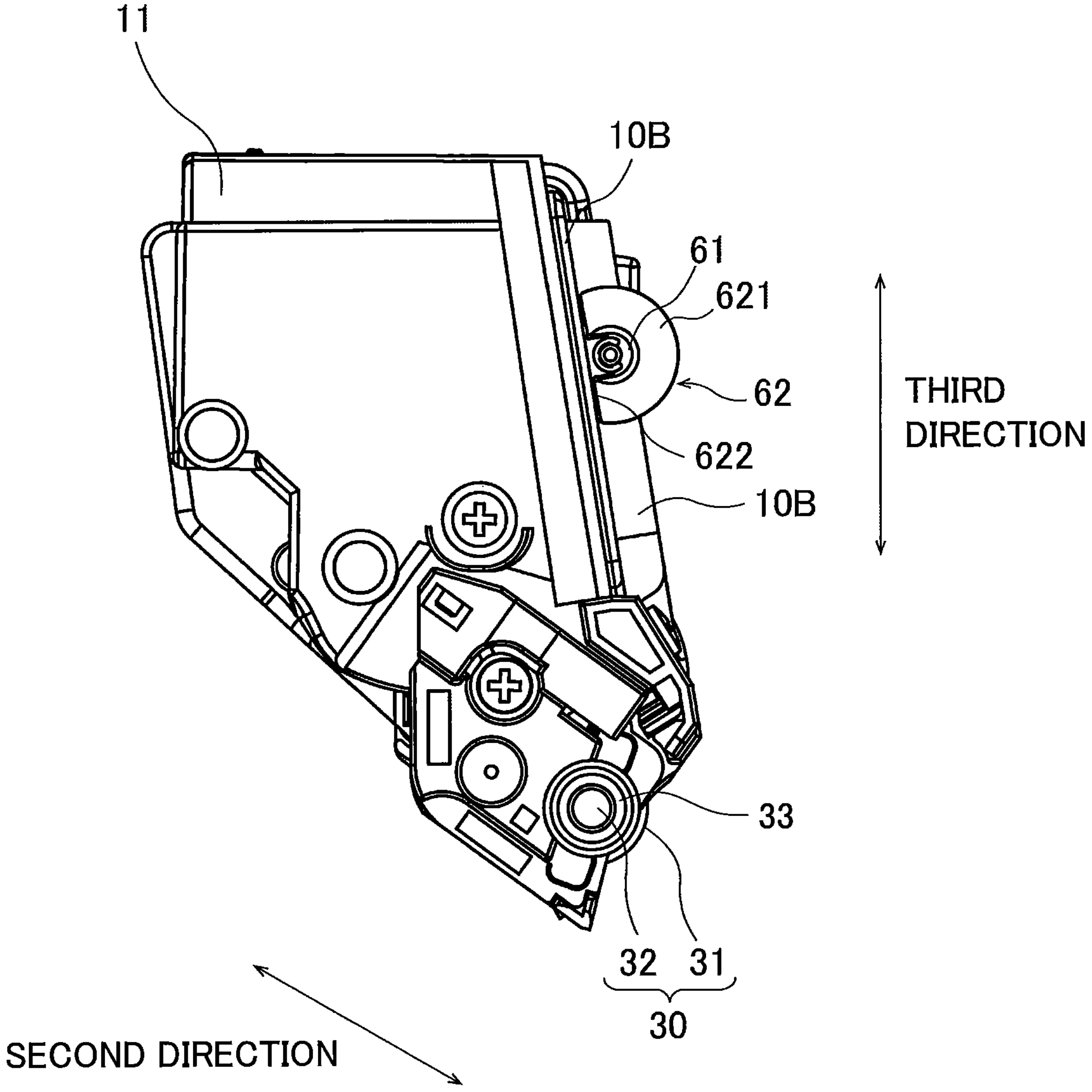
FIG. 5 is another plan view of the developing cartridge according to the first embodiment as viewed in the first direction.

FIGS. 2 and 3 are perspective views of the developing cartridge 1. FIGS. 4 and 5 are plan views of the developing cartridge 1 as viewed in a first direction.

In the following description, a direction in which a rotational axis (i.e., a first axis) of a developing roller 30 extends will be referred to as "first direction". The first direction also denotes a direction in which a rotational axis (a drum axis) of a photosensitive drum 21 (described later) of the drawer 2 extends. Here, an outer circumferential surface of the developing roller 30 includes one end portion exposed to the outside of a casing 10, and another end portion positioned inside the casing 10. A direction in which the one end portion of the circumferential surface of the developing roller 30 and the other end portion of the circumferential surface are arrayed will be referred to as "second direction". The second direction also denotes a direction crossing the circumferential surface of the developing roller 30 which is exposed to the outside of the casing 10 of the developing cartridge 1. The second direction may denote a direction which the outer circumferential surface of the developing roller 30 is separated from and/or approaches an outer circumferential surface the photosensitive drum 21 (described later). The first direction and the second direction cross each other. Preferably, the first direction and the second direction are perpendicular to each other.

The developing cartridge 1 includes the casing 10 configured to accommodate developer therein. The casing 10 has a first outer surface 11 and a second outer surface 12 those are separated from each other in the first direction. The casing 10 extends in the first direction between the first outer surface 11 and the second outer surface 12. That is, the first outer surface 11 is one end of the casing 10 in the first direction, and the second outer surface 12 is another end of the casing 10 in the first direction.

The casing 10 includes a container 10A and a lid 10B. The container 10A is configured to accommodate developer therein, and has an opening (not illustrated). The lid 10B covers the opening (not illustrated) of the container 10A. The container 10A and the lid 10B are disposed at a position between the first outer surface 11 and the second outer surface 12 in the first direction.

The casing 10 also extends in a predetermined direction. Hereinafter, the predetermined direction in which the casing 10 extends will be referred to as "third direction". The third direction crosses the first direction. Preferably, the third direction is perpendicular to the first direction. The third direction may denote a direction which the developing cartridges 1 are inserted into and/or extracted from the corresponding slots 2A (see FIG. 1) of the drawer 2. The casing 10 has an opening 10C. The opening 10C is positioned at one end portion of the casing 10 in the third direction. The container 10A and an outside of the casing 10 are in communication with each other through the opening 10C.

The developing cartridge 1 further includes an agitator 20. The agitator 20 is rotatable about an axis (i.e., a third axis) extending in the first direction. The agitator 20 is a member configured to agitate the developer accommodated in the container 10A. The agitator 20 includes a shaft extending in the first direction, and an agitation blade extending radially outward from the shaft. Upon rotation of the shaft, the developer accommodated in the container 10A is agitated by the agitation blade.

The developing cartridge 1 further includes the developing roller 30. The developing roller 30 is spaced apart from the agitator 20 in the second direction. Further, the agitator 20 is positioned closer to the developing roller 30 than a shaft 61 (described later) is to the developing roller 30 in the second direction. The developing roller 30 is positioned at the opening 10C, which is positioned at the one end portion of the casing 10 in the third direction. The developing roller 30 is a roller supported by the casing 10 so as to be rotatable about the first axis extending in the first direction.

The developing roller 30 includes a developing roller body 31 and a developing roller shaft 32. The developing roller body 31 has a hollow cylindrical shape extending in the first direction. The developing roller body 31 is made of a material having elasticity, such as rubber. The developing roller shaft 32 has a columnar shape extending through the developing roller body 31 in the first direction. The developing roller shaft 32 is made of metal or a resin having electrical conductivity. The developing roller body 31 is fixed to the developing roller shaft 32 so as not to rotate relative to the developing roller shaft 32. With this configuration, the developing roller body 31 is rotatable together with the developing roller shaft 32. The developing roller 30 (i.e., the developing roller body 31) is at least partially exposed to the outside of the casing 10. That is, at least a part of an outer circumferential surface of the developing roller 30 is exposed to the outside of the casing 10. More specifically, the one end portion of an outer circumferential surface of the developing roller body 31 in the second direction is exposed to the outside of the casing 10 through the opening 10C. The other end portion of the outer circumferential surface of the developing roller body 31 in the second direction is positioned inside the casing 10. That is, the other end portion of the outer circumferential surface of the developing roller body 31 in the second direction is not exposed to the outside of the casing 10.

The developing cartridge 1 further includes a developing electrode 33. The developing electrode 33 is positioned at one end of the developing roller shaft 32 in the first direction. Here, the developing roller shaft 32 to which the developing electrode 33 is provided is rotatably attached to a bearing (not illustrated) of the casing 10. The bearing may be integrally formed at the casing 10, or may be separately formed from the casing 10. The developing electrode 33 is positioned at the first outer surface 11. The developing electrode 33 is electrically connected to the developing roller shaft 32 of the developing roller 30. The developing electrode 33 is an electrode for applying a developing bias to the developing roller 30. The developing electrode 33 is positioned closer to the developing roller 30 than the shaft 61 and a first cam 62 of a separation member 60 (described later) are to the developing roller 30 in the second direction.

A developing roller gear (not illustrated) is coupled to another end portion of the developing roller shaft 32 in the first direction. The developing roller gear is positioned at the second outer surface 12. The developing roller shaft 32 is fixed to the developing roller gear so as not to rotate relative to the developing roller gear. When the developing roller gear rotates, the developing roller shaft 32 also rotates, thereby causing rotation of the developing roller body 31 together with the developing roller shaft 32.

Incidentally, the developing roller shaft 32 may not extend through the developing roller body 31 in the first direction. For example, each of a pair of developing roller shafts 32 may extend in the first direction from each end portion of the developing roller body 31 in the first direction.

The developing cartridge 1 further includes a supply roller (not illustrated). The supply roller is disposed inside the container 10A at a position between the developing roller 30 and the agitator 20. The supply roller is rotatable about a rotational axis extending in the first direction. When the developing cartridge 1 receives a driving force, the developer is supplied from the container 10A of the casing 10 to the outer circumferential surface of the developing roller 30 (i.e., an outer circumferential surface of the developing roller body 31) through the supply roller. At this time, the developer is triboelectric charged between the supply roller and the developing roller 30. In the meantime, a developing bias is applied to the developing roller shaft 32 of the developing roller 30. Accordingly, the developer is attracted to the outer circumferential surface of the developing roller body 31 by the electrostatic force generated between the developing roller shaft 32 and the developer.

The developing cartridge 1 further includes a layer-thickness regulation blade (not illustrated). The layer-thickness regulation blade regulates a thickness of a layer of the developer supplied onto the outer circumferential surface of the developing roller body 31 so that the thickness of the layer of the developer is formed to a constant thickness. The developer on the outer circumferential surface of the developing roller body 31 is then supplied to the photosensitive drum 21 (described later, see FIG. 11) of the drawer 2. At this time, the developer is transferred from the developing roller body 31 to the photosensitive drum 21, in accordance with an electrostatic latent image formed on the outer circumferential surface of the photosensitive drum 21. Accordingly, the electrostatic latent image formed on the outer circumferential surface of the photosensitive drum 21 becomes a visible image.

As illustrated in FIGS. 3 and 4, the developing cartridge 1 further includes a gear portion 40. The gear portion 40 is positioned at the second outer surface 12 of the casing 10. The gear portion 40 includes a coupling 41 and the developing roller gear (not illustrated).

The coupling 41 is a gear which receives the driving force applied from the main frame 101 of the image forming apparatus 100. The coupling 41 is rotatable about a rotational axis extending in the first direction. The coupling 41 is positioned closer to the developing roller 30 than the shaft 61, the first cam 62, and a second cam 63 of the separation member 60 (described later) are to the developing roller 30 in the second direction. The coupling 41 has a coupling hole 411 recessed in the first direction. When the developing cartridge 1 attached to the slot 2A of the drawer 2 is attached to the main frame 101 of the image forming apparatus 100, a drive shaft (not illustrated) of the image forming apparatus 100 is inserted into the coupling hole 411. Thus, the drive shaft and the coupling 41 are coupled with each other so that relative rotation between the drive shaft and the coupling 41 is prevented. Accordingly, when the drive shaft rotates, the coupling 41 also rotates. Further, as the coupling 41 rotates, a supply shaft connected to the supply roller (not illustrated)

and the developing roller gear rotate. By this rotation, the supply roller rotates together with the supply shaft, and the developing roller 30 rotates together with the developing roller gear. The rotation of the coupling 41 also causes rotation of the agitator 20 through another gear (not illustrated).

The image forming apparatus 100 has a contact state and a separation state. In the contact state of the image forming apparatus 100, the developing roller 30 and the photosensitive drum 21 of the drawer 2 are in contact with each other in a state where the developing cartridge 1 is attached to the slot 2A of the drawer 2. In the separation state of the image forming apparatus 100, the developing roller 30 and the photosensitive drum 21 of the drawer 2 are separated from each other. At the time of attachment of the developing cartridge 1 to the slot 2A of the drawer 2, the image forming apparatus 100 is in the contact state.

The developing cartridge 1 further includes the separation member 60. The separation member 60 is a member for switching a state of the image forming apparatus 100 between the contact state and the separation state. In the present embodiment, when the image forming apparatus 100 is switched from the contact state to the separation state, the developing roller 30 moves away from the photosensitive drum 21 in the second direction which is a separation direction of the developing roller 30 from the photosensitive drum 21.

The separation member 60 is disposed at the lid 10B. The separation member 60 is movable in the first direction relative to the casing 10 and the developing roller 30. In addition, the separation member 60 is movable in the second direction together with the casing 10 and the developing roller 30.

Figure 6:
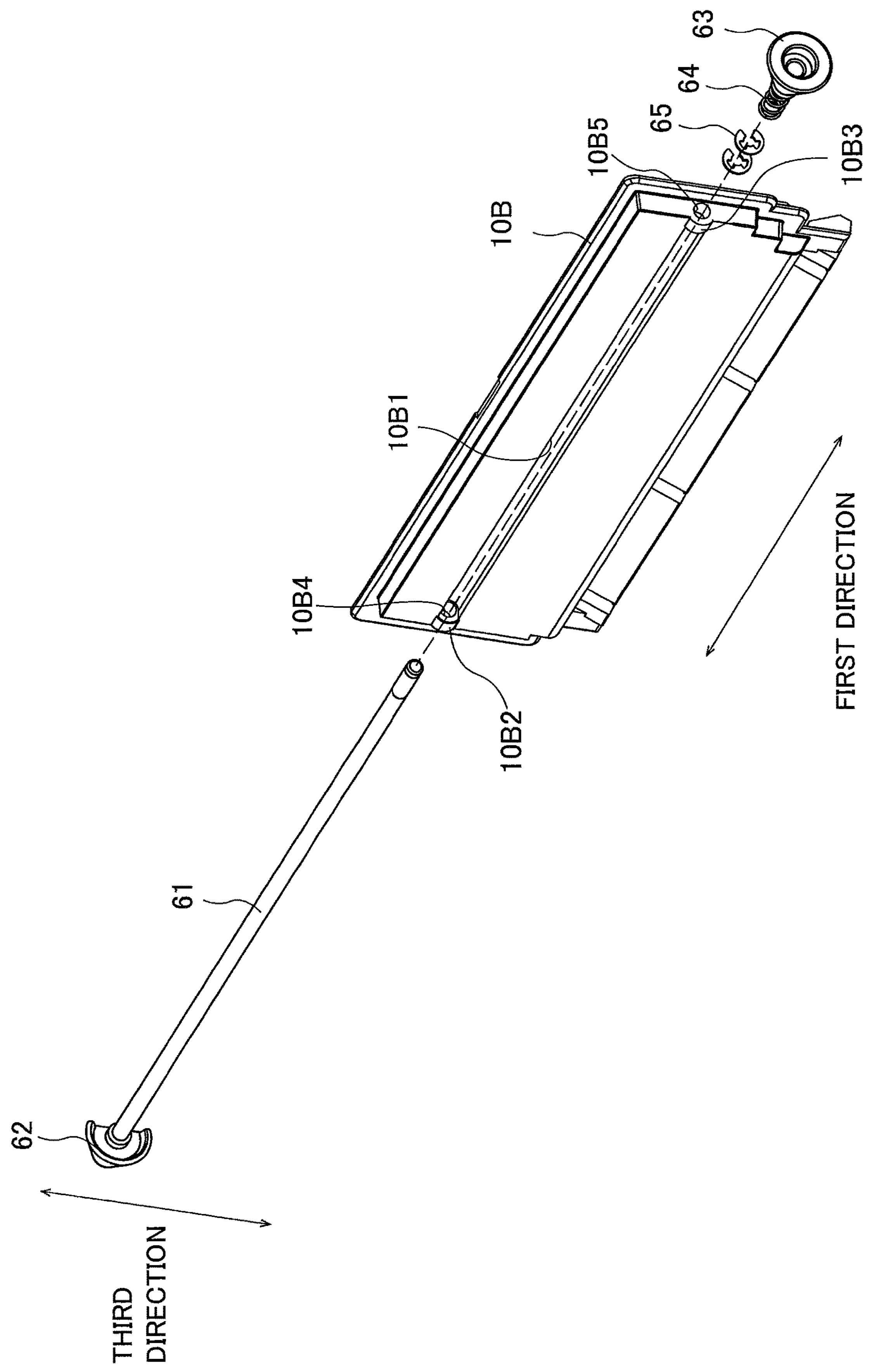
FIG. 6 is an exploded perspective view of a separation member of the developing cartridge according to the first embodiment.
Figure 7:
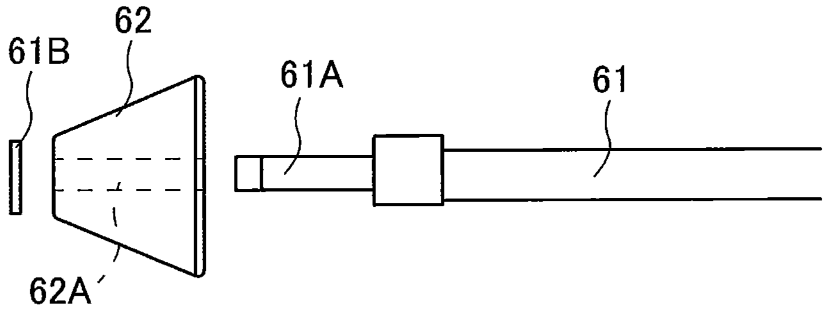
FIG. 7 is an exploded enlarged view of a shaft and a first cam of the separation member.
Figure 8:
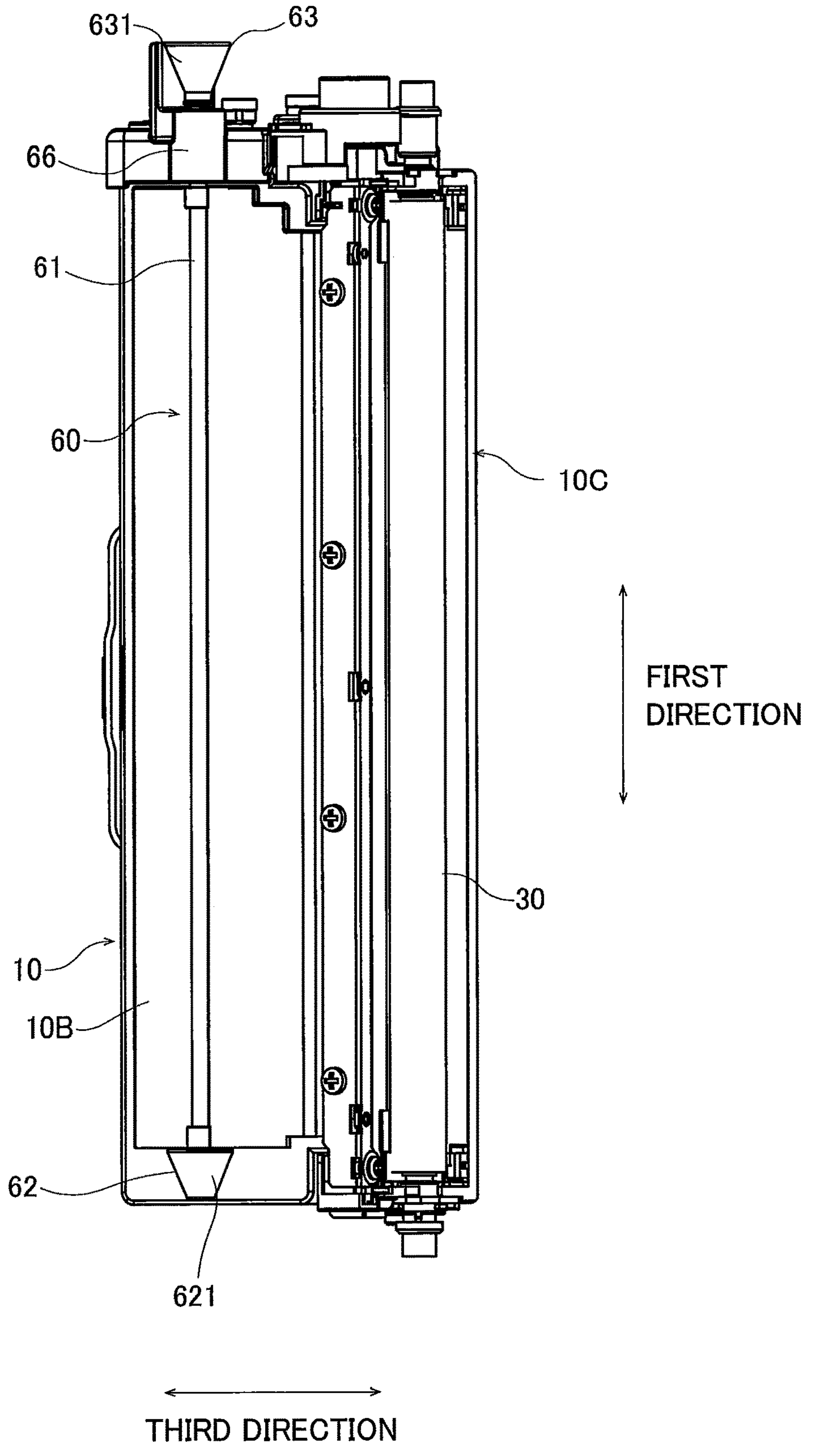
FIG. 8 is a view for description of movement of the separation member in the first direction relative to a casing and a developing roller of the developing cartridge according to the first embodiment.
Figure 9:
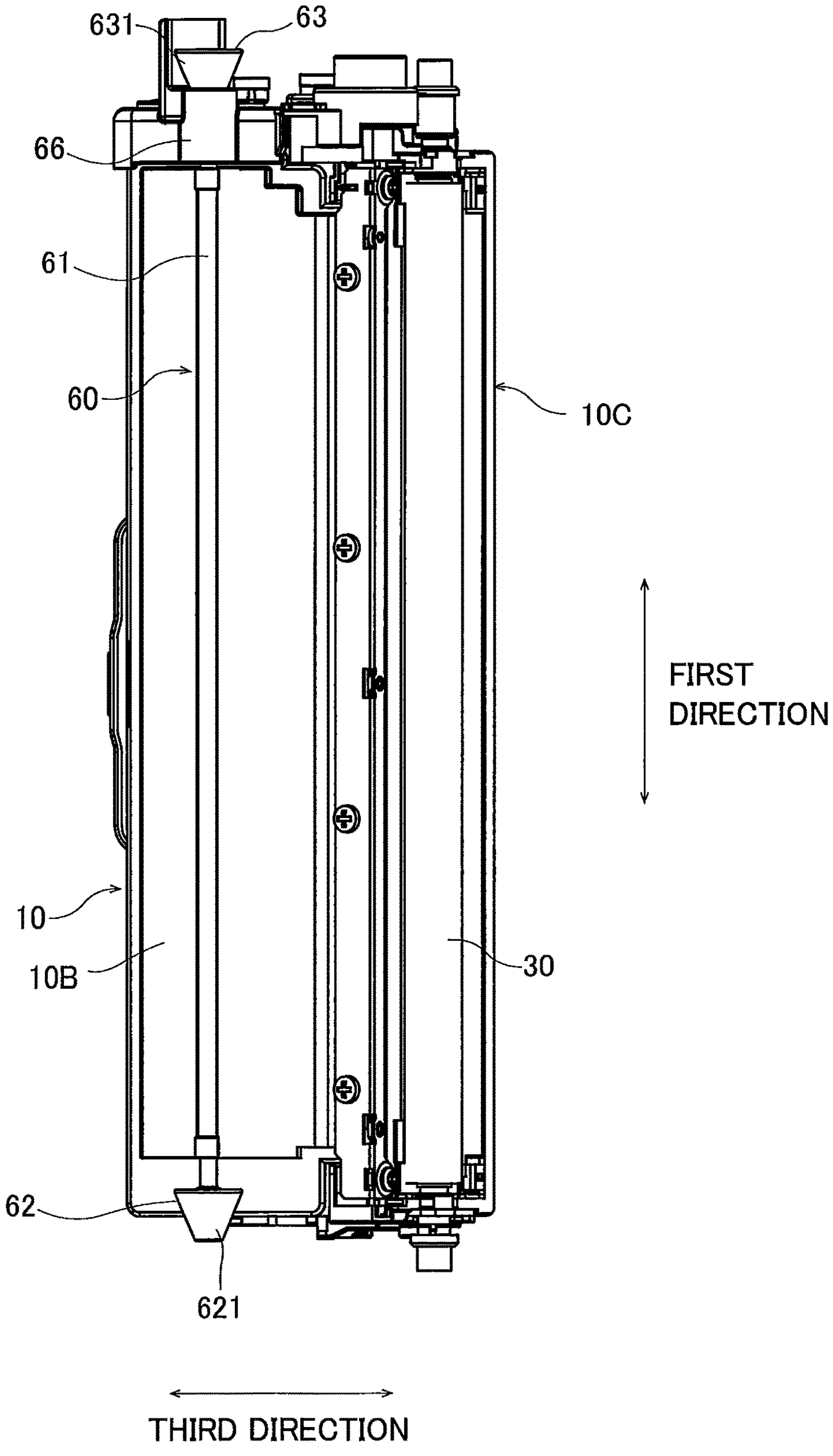
FIG. 9 is another view for description of movement of the separation member in the first direction relative to the casing and the developing roller.
Figure 10:
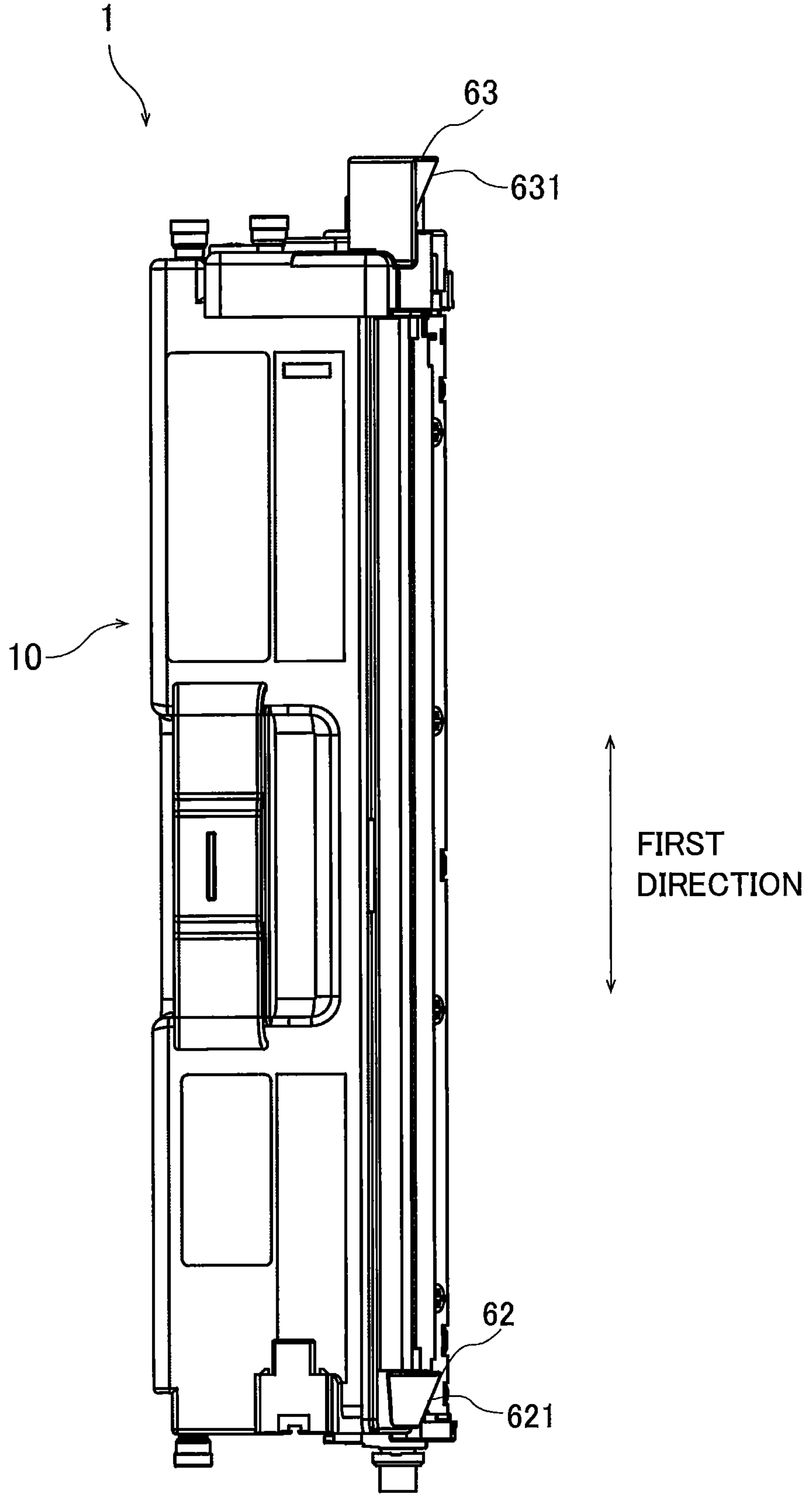
FIG. 10 is a plan view of the developing cartridge according to the first embodiment as viewed in the third direction.

FIG. 6 is an exploded perspective view of the separation member 60. Of the casing 10, only the lid 10B at which the separation member 60 is disposed is illustrated in FIG. 6. FIG. 7 is an exploded enlarged view of the shaft 61 and the first cam 62 in the separation member 60. FIGS. 8 and 9 are views for description of movement of the separation member 60 in the first direction relative to the casing 10 and the developing roller 30. FIG. 10 is a plan view of the developing cartridge 1 as viewed in the third direction. Hereinafter, the separation member 60 will be described with reference to FIGS. 2 through 10.

The separation member 60 includes the shaft 61 that extends along an axis (i.e., a second axis) extending in the first direction. The shaft 61 has a circular columnar shape. The shaft 61, however, may have a rectangular columnar shape. The lid 10B has a groove 10B1, a hole 10B4, and a hole 10B5 each penetrating the lid 10B in the first direction. Each of the groove 10B1, the hole 10B4, and the hole 10B5 has a diameter greater than a diameter of the shaft 61. The shaft 61 is inserted through the groove 10B1, the hole 10B4, and the hole 10B5. The shaft 61 inserted into the groove 10B1, the hole 10B4, and the hole 10B5 is movable in the first direction relative to the lid 10B of the casing 10 between a first position (a position illustrated in FIG. 8) and a second position (a position illustrated in FIG. 9). The shaft 61 in the second position is closer to the first outer surface 11 than the shaft 61 in the first position is to the first outer surface 11. Note that, while the lid 10B has two holes (i.e., the hole 10B4 and the hole 10B5) in the present embodiment, the lid 10B may have at least one hole as long as the lid 10B can movably support the shaft 61.

Preferably, the shaft 61 is made of material having rigidity. For example, the shaft 61 is made of iron. Alternatively, the shaft 61 may be made of resin.

In the present embodiment, the casing 10 includes ring-shaped portions 10B2 and 10B3. The ring-shaped portion 10B2 is formed at one end portion of the lid 10B in the first direction, while the ring-shaped portion 10B3 is formed at another end portion of the lid 10B in the first direction. Both the ring-shaped portions 10B2 and 10B3 are integrally formed at the lid 10B. The through-hole penetrating the ring-shaped portion 10B2 is the hole 10B4, and the through-hole penetrating the ring-shaped portion 10B3 is the hole 10B5. The groove 10B1 formed along the first direction are exposed between the ring-shaped portion 10B2 and the ring-shaped portion 10B3. That is, the shaft 61 inserted into the groove 10B1, the hole 10B4, and the hole 10B5 is exposed from the lid 10B at a position between the ring-shaped portion 10B2 and the ring-shaped portion 10B3. Since the shaft 61 has rigidity, a portion of the shaft 61 exposed from the lid 10B will not be bent toward the second direction or the third direction (i.e., directions other than the first direction).

Incidentally, only one ring-shaped portion may be formed at the lid 10B. Alternatively, an additional ring-shaped portion(s) may be disposed between the ring-shaped portions 10B2 and 10B3. Although the shaft 61 is exposed at a position between the ring-shaped portions 10B2 and 10B3 in the first direction in the present embodiment, the shaft 61 may not be exposed from the lid 10B. That is, the shaft 61 may be accommodated inside the lid 10B.

As described above, the shaft 61 is supported by the lid 10B so as to be movable in the first direction along the second axis. Accordingly, the shaft 61 can be easily disposed at the casing 10.

The first cam 62 is disposed at one end portion 61A of the shaft 61 in the first direction. The first cam 62 is made of rubber or resin, for example. As illustrated in FIG. 7, the first cam 62 has a hole 62A penetrating the first cam 62 in the first direction. The one end portion 61A of the shaft 61 has a diameter smaller than a diameter of a portion of the shaft 61 other than the one end portion 61A. The one end portion 61A of the shaft 61 is inserted into the hole 62A. The one end portion 61A inserted into the hole 62A has a distal end exposed from the first cam 62 in the first direction, and a retaining ring 61B is attached to the exposed distal end of the one end portion 61A. With this configuration, the first cam 62 is fixed to the one end portion 61A of the shaft 61. Alternatively, the first cam 62 may be adhesively fixed to the shaft 61.

The first cam 62 has a first inclined surface 621 that is non-parallel with the second axis. In the present embodiment, the first inclined surface 621 is positioned at a portion of a peripheral surface of the shaft 61 as illustrated in FIG. 5. More specifically, the first inclined surface 621 is positioned at one end portion of the shaft 61 in the second direction. The one end portion of the shaft in the second direction is closer to the developing roller 30 than another end portion of the shaft 61 in the second direction is to the developing roller 30. The first cam 62 further has a contact surface 622 that faces the lid 10B. The contact surface 622 is disposed at another portion of the peripheral surface of the shaft 61, that is different from the portion of the peripheral surface at which the first inclined surface 621 is positioned. In other words, the contact surface 622 faces the casing 10, i.e., an outer surface of the casing 10. Since the contact surface 622 faces the lid 10B, even if the first cam 62 tries to rotate about the shaft 61, the contact surface 622 contacts the lid 10B, thereby preventing rotation of the first cam 62. Although the first inclined surface 621 is disposed at a portion of the peripheral surface of the shaft 61 in the present embodiment, the first inclined surface 621 may be disposed at the whole of the peripheral surface of the shaft 61.

The first inclined surface 621 is inclined relative to the shaft 61 extending in the first direction and angled relative to the second axis. In other words, the first inclined surface 621 is inclined relative to a direction connecting the one end portion of the outer circumferential surface of the developing roller 30 and the other end portion of the outer circumferential surface of the developing roller 30. An angle between the first inclined surface 621 and the first direction is greater than or equal to 43 degrees and smaller than or equal to 47 degrees. More preferably, the angle between the first inclined surface 621 and the first direction is about 45 degrees.

The first cam 62, i.e., the first inclined surface 621 is positioned at the first outer surface 11 of the casing 10. As the first inclined surface 621 extends in a direction away from the first outer surface 11 in the first direction, the first inclined surface 621 extends away from the developing roller 30 in the second direction. That is, the first inclined surface 621 is formed such that a distance between the shaft 61 (i.e., the second axis) and the first inclined surface 621 in a radial direction of the shaft 61 (i.e., the second direction) increases in a direction from the one end portion 61A of the shaft 61 in the first direction toward the other end portion of the shaft 61 in the first direction. In other words, the first inclined surface 621 is inclined relative to the first direction such that the distance between the first inclined surface 621 and the shaft 61 in a direction perpendicular to the first axis increases from the one end portion 61A of the shaft 61 in the first direction to the other end portion of the shaft 61 in the first direction. Further in other words, the first inclined surface 621 is inclined relative to the first direction such that a distance between the first inclined surface 621 and the developing roller 30 in the second direction increases or decreases relative to the casing 10 in the first direction. Further in other words, the first inclined surface 621 is inclined relative to the first direction such that one end of the first inclined surface 621 in the first direction is closer to the shaft 61 than another end of the first inclined surface 621 in the first direction is to the shaft 61 in the second direction. The first inclined surface 621 is inclined relative to the shaft 61 by an acute angle.

The first cam 62 is formed like the half of a cone centered on the second axis. In other words, the first cam 62 has a portion of a circumferential surface of the cone serving as the first inclined surface 621.

Note that the first cam 62 may have a pyramid shape instead of a cone shape. In this case, the second axis passes through a vertex and the center of a bottom surface of the pyramid, and a portion of a lateral surface of the pyramid serves as the first inclined surface 621. Further, while the first inclined surface 621 is smoothly inclined relative to the shaft 61 in the present embodiment, the first inclined surface 621 may have protrusions and recessed portions, such as steps. Alternatively, the first inclined surface 621 may be curved.

The second cam 63 is disposed at another end portion of the shaft 61 in the first direction. The second cam 63 is made of rubber or resin, for example. Similar to the first cam 62 described with reference to FIG. 7, the second cam 63 is fixed to the other end portion of the shaft 61 in the first direction.

The second cam 63 has a second inclined surface 631 that is non-parallel with the second axis. In the present embodiment, the second inclined surface 631 is positioned at the whole peripheral surface of the shaft 61, as illustrated in FIG. 4. Incidentally, the second inclined surface 631 may be disposed at a portion of the peripheral surface of the shaft 61. In this case, the second inclined surface 631 is positioned at the one end portion of the shaft 61 in the second direction, i.e., the end portion positioned closer to the developing roller 30 than the other end portion to the developing roller 30.

The second inclined surface 631 is inclined relative to the shaft 61 that extends in the first direction and angled relative to the second axis. In other words, the second inclined surface 631 is inclined relative to the direction connecting the one end portion of the outer circumferential surface of the developing roller 30 and the another end portion of the outer circumferential surface of the developing roller 30. An angle between the second inclined surface 631 and the first direction is greater than or equal to 43 degrees and smaller than or equal to 47 degrees. More preferably, the angle between the second inclined surface 631 and the first direction is about 45 degrees.

The second inclined surface 631 is formed such that a distance between the shaft 61 (i.e., the second axis) and the second inclined surface 631 in the radial direction of the shaft 61 (i.e., the second direction) increases in the direction from the one end portion 61A of the shaft 61 in the first direction to the other end portion of the shaft 61 in the first direction. In other words, the second inclined surface 631 is inclined relative to the first direction such that the distance between the second inclined surface 631 and the shaft 61 in a direction perpendicular to the first axis increases from the one end portion 61A of the shaft 61 in the first direction to the other end portion of the shaft 61 in the first direction. Further in other words, the second inclined surface 631 is inclined relative to the first direction such that a distance between the second inclined surface 631 and the developing roller 30 in the second direction increases or decreases relative to the casing 10 in the first direction. Further in other words, the second inclined surface 631 is inclined relative to the first direction such that one end of the second inclined surface 631 in the first direction is closer to the shaft 61 than another end of the second inclined surface 631 in the first direction is to the shaft 61 in the second direction. The second inclined surface 631 is inclined relative to the shaft 61 by an acute angle. That is, the first inclined surface 621 of the first cam 62 and the second inclined surface 631 of the second cam 63 are inclined in the same direction relative to the first direction.

A radial distance from the second axis to the second inclined surface 631 increases as a distance from the first inclined surface 621 to the second inclined surface 631 increases, and a radial distance from the second axis to the first inclined surface 621 decreases as a distance from the first inclined surface 621 to the second inclined surface 631 increases.

The second cam 63 has a cone shape centered on the second axis. In other words, the second cam 63 has a portion of a circumferential surface of the cone serving as the second inclined surface 631.

The second cam 63 may have a pyramid shape, not a cone shape. In this case, the second axis passes through a vertex and the center of a bottom surface of the pyramid, and a portion of a lateral surface of the pyramid serves as the second inclined surface 631. In the present embodiment, the second inclined surface 631 is smoothly inclined relative to the shaft 61. However, the second inclined surface 631 may have protrusions or recessed portions, such as steps. Alternatively, the second inclined surface 631 may be curved.

As illustrated in FIGS. 8 and 9, both the first cam 62 and the second cam 63 are movable in the first direction together with the shaft 61. That is, both the first cam 62 and the second cam 63 are axially movable together with the shaft 61 along the second axis in response to axial movement of the shaft 61 in the first direction. When the shaft 61 moves from the first position to the second position in the first direction, the second cam 63 approaches the lid 10B, and the first cam 62 recedes from the lid 10B. When the shaft 61 moves from the second position to the first position in the first direction, the second cam 63 recedes from the lid 10B, and the first cam 62 approaches the lid 10B. In other words, when the shaft 61 moves from the first position to the second position in the first direction, the second cam 63 approaches the casing 10, and the first cam 62 moves away from the casing 10. When the shaft 61 moves from the second position to the first position in the first direction, the second cam 63 moves away from the casing 10, and the first cam 62 approaches the casing 10.

In the present embodiment, the contact surface 622 of the first cam 62 faces the lid 10B, and this configuration prevents the first cam 62 from rotating. Accordingly, the shaft 61 to which the first cam 62 is fixed, and the second cam 63 fixed to the shaft 61 are also not rotatable relative to the lid 10B. That is, the shaft 61 inserted through the hole 10B5 and the hole 10B4 is not rotatable about the second axis extending in the first direction relative to the lid 10B of the casing 10. However, the shaft 61 may be rotatable about the second axis extending in the first direction relative to the lid 10B. In a case where the shaft 61 is configured so as to be rotatable relative to the first cam 62 and the second cam 63, only the shaft 61 rotates relative to the lid 10B, the first cam 62 and the second cam 63, and the first cam 62 and the second cam 63 do not rotate. Alternatively, the shaft 61 may be rotatable about the second axis together with the first cam 62 and the second cam 63.

The separation member 60 further includes a coil spring 64. The coil spring 64 is positioned at the other end portion of the shaft 61 in the first direction. Specifically, the shaft 61 is inserted into the coil spring 64. The coil spring 64 is positioned between the second cam 63 and the lid 10B in the first direction. One end of the coil spring 64 in the first direction is in contact with the lid 10B through, for example, a washer 65. Another end of the coil spring 64 in the first direction is in contact with the second cam 63. That is, the one end of the coil spring 64 is connected to the casing 10, while the another end of the coil spring 64 is connected to the second inclined surface 631. The coil spring 64 is covered with a cover 66 in a circumferential direction of the shaft 61. Although the coil spring 64 is connected to the shaft 61 through the second cam 63, the coil spring 64 may be directly connected to the shaft 61.

The coil spring 64 is an elastic member configured to extend and contract in the first direction between a first length and a second length shorter than the first length. As will be described later in detail, the second cam 63 is pressed by a pressing force applied in a direction from the other end portion of the shaft 61 to the one end portion 61A of the shaft 61 in the first direction. Accordingly, the shaft 61 moves from the first position illustrated in FIG. 8 to the second position illustrated in FIG. 9 together with the first cam 62 and the second cam 63. When the shaft 61 moves from the first position to the second position, the coil spring 64 is compressed from the first length to the second length. When the pressing force applied to the second cam 63 is released, the coil spring 64 is restored from the second length to the first length due to a restoring force of the coil spring 64, whereby the shaft 61 moves back, from the second position to the first position, together with the first cam 62 and the second cam 63. In this way, the shaft 61, the first cam 62, and the second cam 63 are movable in the first direction relative to the casing 10 due to the pressing force applied in the first direction and the elastic force (restoring force) of the coil spring 64.

<1.3. Drawer>

Figure 11:
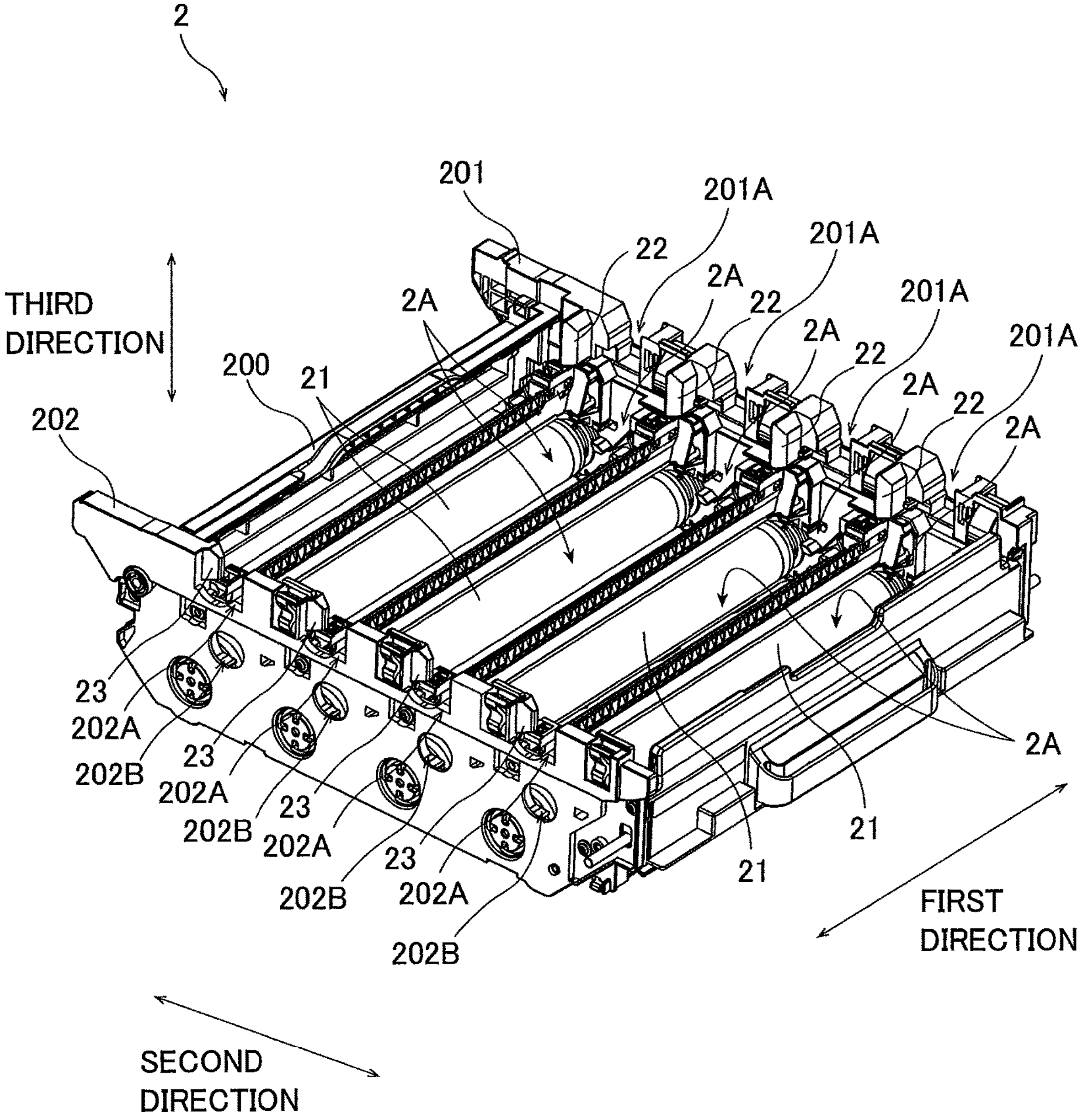
FIG. 11 is a perspective view of a drawer to which the developing cartridge according to the first embodiment is detachably attached.
Figure 12:
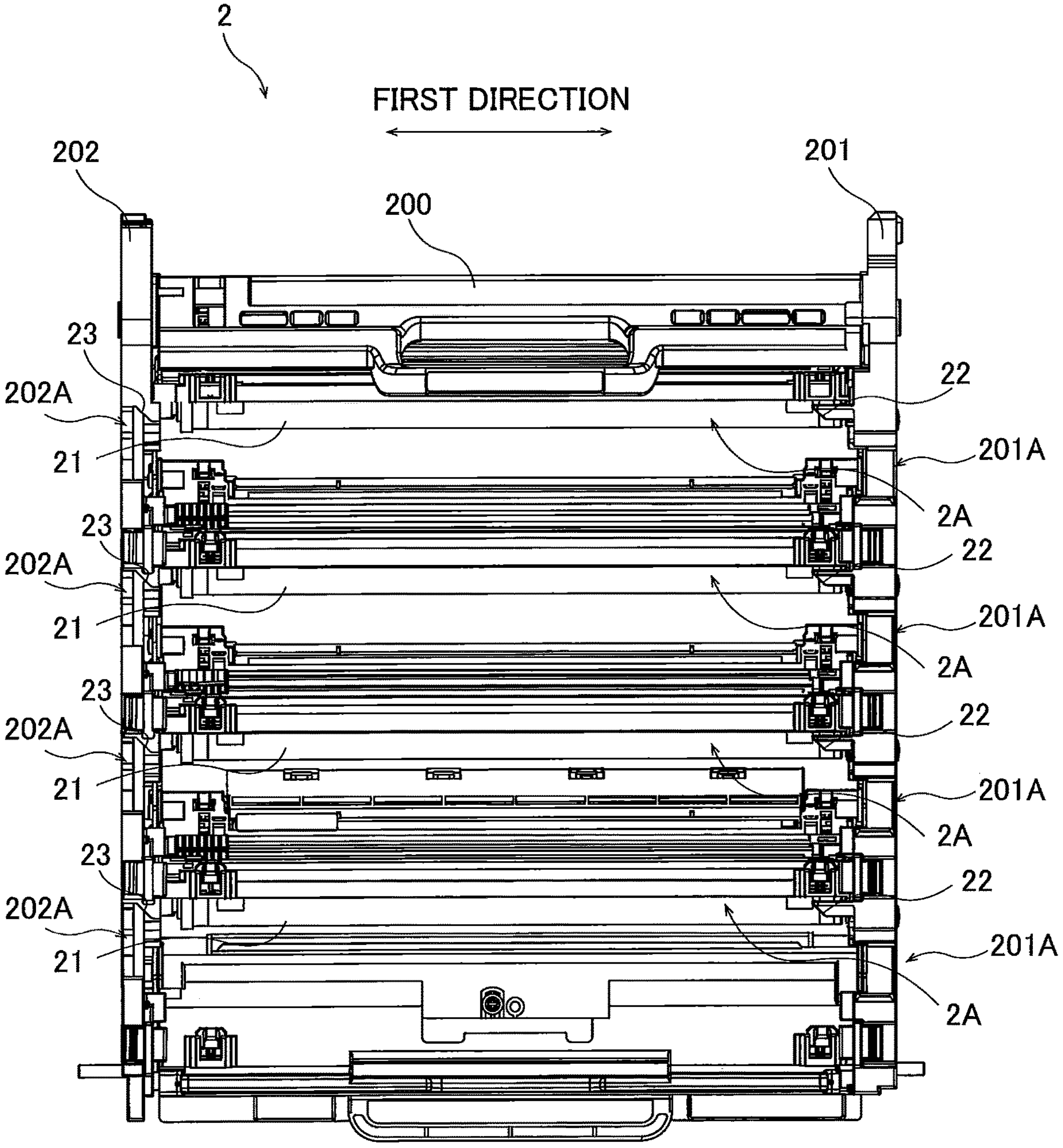
FIG. 12 is a plan view of the drawer as viewed in the third direction.
Figure 13:
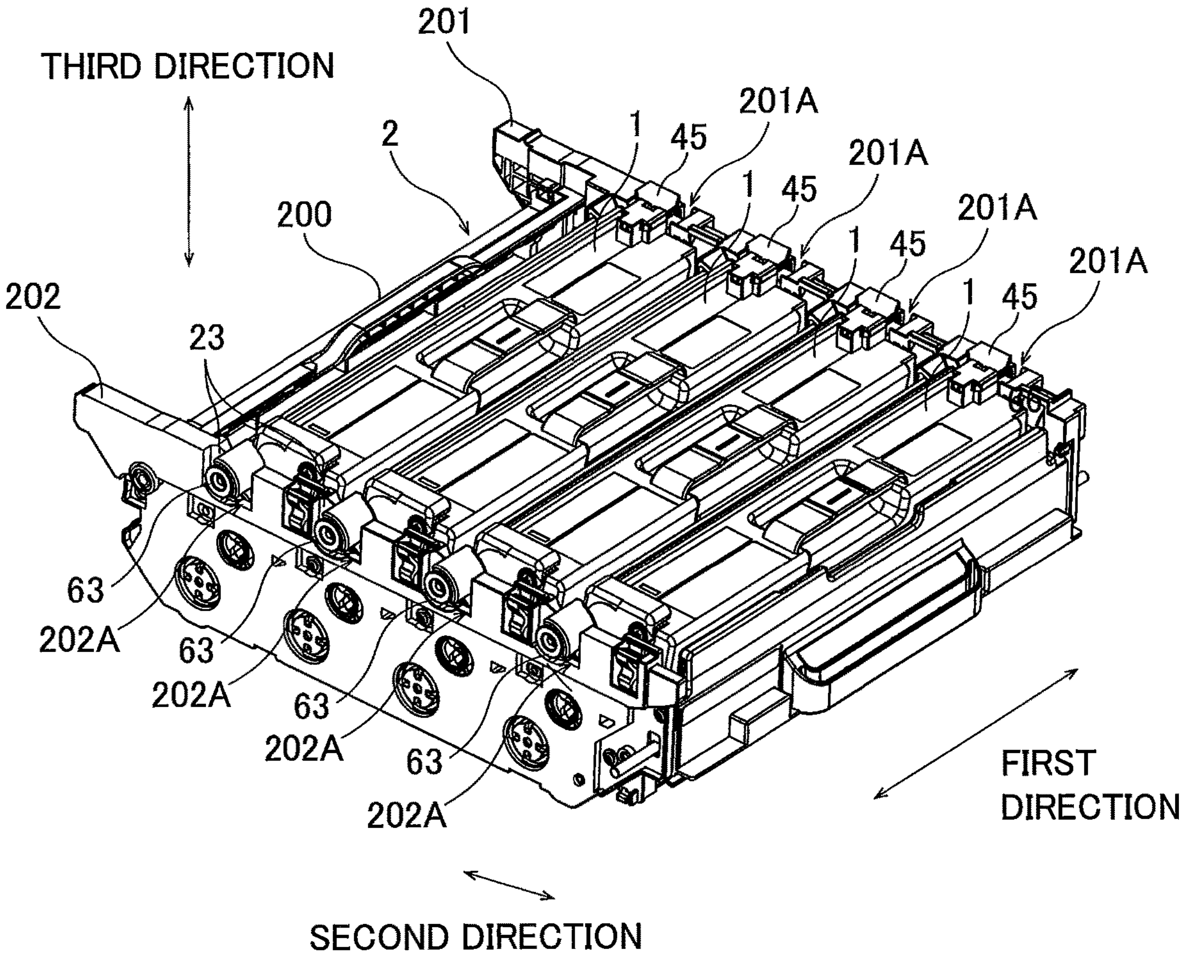
FIG. 13 is a perspective view of the drawer and the developing cartridges according to the first embodiment, and illustrating a state where the developing cartridges are attached to the drawer.
Figure 14:
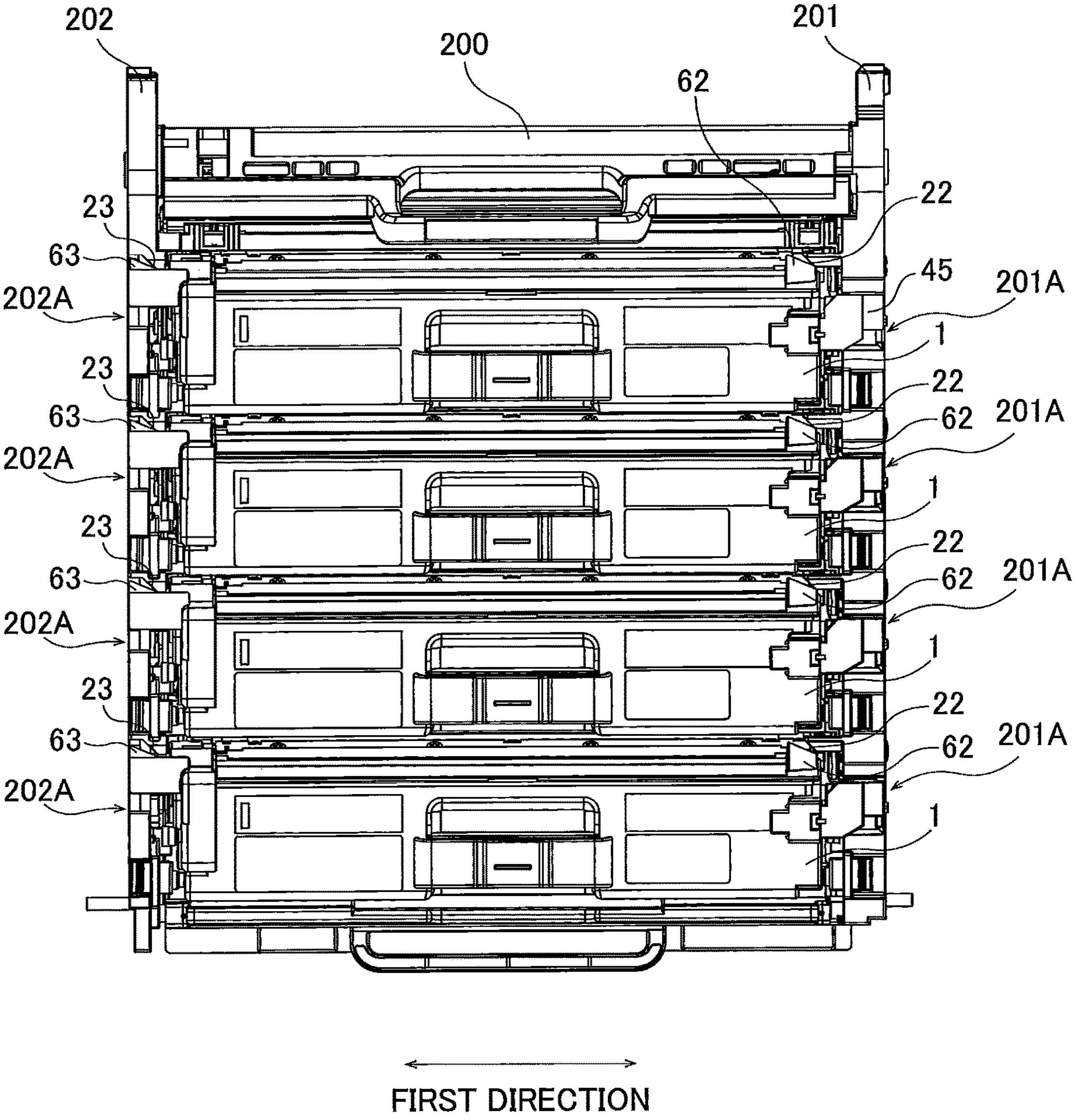
FIG. 14 is a plan view of the drawer and the developing cartridges according to the first embodiment as viewed in the third direction, and illustrating a state where the developing cartridges are attached to the drawer.
Figure 15:
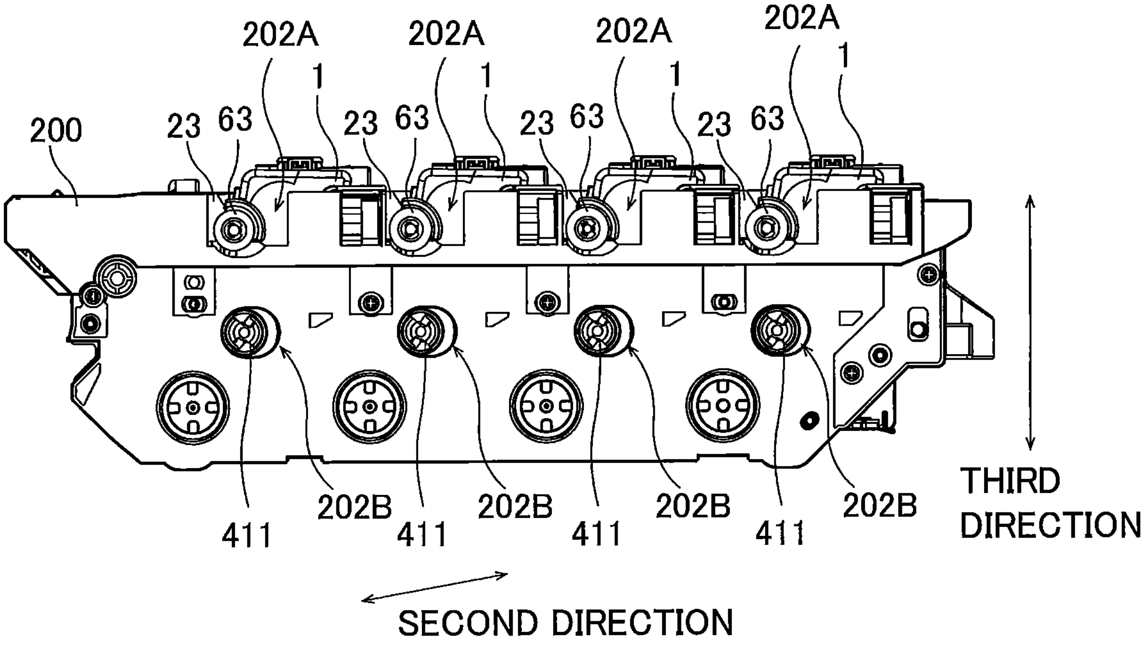
FIG. 15 is a plan view of the drawer and the developing cartridges according to the first embodiment as viewed in the first direction, and illustrating a state where the developing cartridges are attached to the drawer.

FIG. 11 is a perspective view of the drawer 2. FIG. 12 is a plan view of the drawer 2 as viewed in the third direction. FIG. 13 is a perspective view of the drawer 2 and the developing cartridges 1, illustrating a state where the developing cartridges 1 are attached to the corresponding slots 2A of the drawer 2. FIG. 14 is a plan view of the drawer 2 and the developing cartridges 1 as viewed in the third direction, and illustrating the state where the developing cartridges 1 are attached to the corresponding slots 2A of the drawer 2. FIG. 15 is a plan view of the drawer 2 and the developing cartridges 1 as viewed in the first direction, and illustrating the state where the developing cartridges 1 are attached to the corresponding slots 2A of the drawer 2.

The drawer 2 includes a frame 200. The frame 200 includes the four slots 2A. The developing cartridges 1 are respectively attachable to the corresponding slots 2A. The drawer 2 also includes the photosensitive drums 21. Each of the photosensitive drums 21 is disposed corresponding to each of the four slots 2A. Each of the photosensitive drums 21 is rotatable about the rotational axis (the drum axis) extending in the first direction. In a state where each developing cartridge 1 is attached to the corresponding slot 2A, the frame 200 movably supports the separation member 60 of each developing cartridge 1. Each of the developing cartridges 1 is attachable to the corresponding slot 2A of the drawer 2 such that the outer circumferential surface of the developing roller 30 faces the outer circumferential surface of the photosensitive drum 21. More specifically, each of the developing cartridge 1 is attachable to the corresponding slot 2A of the drawer 2 in a state where the outer circumferential surface of the developing roller 30 contacts the outer circumferential surface of the photosensitive drum 21.

Note that the drawer 2 includes a conventional (well-known) urging member. In a state where each developing cartridge 1 is attached to the slot 2A, the developing roller 30 of each developing cartridge 1 and the corresponding photosensitive drum 21 are in contact with each other in the second direction due to an urging force applied by the conventional urging member. The drawer 2 which the developing cartridge 1 has been attached to each slot 2A is attached to the main frame 101 (see FIG. 1).

In a state where each developing cartridge 1 is attached to the frame 200 of the drawer 2, the frame 200 is configured to move the developing roller 30 of the attached developing cartridge 1 in the second direction. That is, in response to movement in the first direction of the separation member 60 in a state where the outer circumferential surface of the developing roller 30 is in contact with the outer circumferential surface of the photosensitive drum 21, the frame 200 can move the developing roller 30 in the second direction in which the developing roller 30 moves away from the corresponding photosensitive drum 21.

The frame 200 of the drawer 2 includes a first side frame 201 and a second side frame 202. The first side frame 201 and the second side frame 202 are spaced apart from each other in the first direction. The four photosensitive drums 21 are disposed at positions between the first side frame 201 and the second side frame 202 in the first direction. When the developing cartridges 1 are attached to the slots 2A, the developing cartridges 1 are positioned between the first side frame 201 and the second side frame 202 in the first direction. In this state, the first outer surface 11 of each developing cartridge 1 faces the first side frame 201 in the first direction, and the second outer surface 12 of each developing cartridge 1 faces the second side frame 202 in the first direction.

The first side frame 201 has a first recessed portion 201A formed corresponding to each of the four slots 2A. Each of the first recessed portions 201A penetrates the first side frame 201 in the first direction and recessed toward the corresponding photosensitive drum 21 in the third direction. In a state where each developing cartridge 1 is attached to the corresponding slot 2A of the drawer 2, the IC chip 51 of each developing cartridge 1 covered with a cover 45 is positioned in the corresponding first recessed portion 201A, as illustrated in FIGS. 13 and 14.

The second side frame 202 has second recessed portions 202A. Similar to the first recessed portions 201A, each second recessed portion 202A is formed corresponding to each slot 2A. Each of the second recessed portions 202A penetrates the second side frame 202 in the first direction to expose a portion of the developing cartridge 1 to the outside of the drawer 2, and is open toward a direction away from the corresponding photosensitive drum 21 in the third direction. In a state where each developing cartridge 1 is attached to the corresponding slot 2A of the drawer 2, the second cam 63 of each developing cartridge 1 is positioned in the corresponding second recessed portions 202A, as illustrated in FIGS. 13 through 15.

The second side frame 202 further has through-holes 202B. Each through-holes 202B is formed corresponding to each of the slots 2A. Each of the through-holes 202B penetrates the second side frame 202 in the first direction. In a state where each developing cartridge 1 is attached to the corresponding slot 2A of the drawer 2, the coupling hole 411 of the coupling 41 of each developing cartridge 1 is exposed from the corresponding through-hole 202B, as illustrated in FIGS. 13 through 15. The drive shaft of the image forming apparatus 100 is inserted into each coupling hole 411 through the corresponding through-hole 202B. Accordingly, the drive shafts and the corresponding couplings 41 are coupled with each other so as not to rotate relative to each other.

The drawer 2 has a first receiving surface 22 and a second receiving surface 23 for each slot 2A. The first receiving surface 22 is spaced apart from the second receiving surface 23 in the first direction. That is, the first receiving surface 22 is positioned at one end portion of each slot 2A in the first direction, while the second receiving surface 23 is positioned at another end portion of each slot 2A in the first direction.

Each of the first receiving surface 22 is positioned at a surface of the first side frame 201 that faces the second side frame 202. The first receiving surface 22 is inclined relative to the first direction. More specifically, the first receiving surface 22 is disposed so as to face the first cam 62 of the developing cartridge 1 attached to the slot 2A of the drawer 2 in the second direction. The first receiving surface 22 contacts the first inclined surface 621 of the first cam 62 as illustrated in FIG. 14. The first receiving surface 22 is formed such that a distance between the first receiving surface 22 and the developing cartridge 1 in the second direction increases in a direction away from the first side frame 201 in the first direction (i.e., a direction from the first side frame 201 to the second side frame 202 in the first direction).

The second receiving surface 23 is positioned at each second recessed portion 202A formed at the second side frame 202. The second receiving surface 23 is inclined relative to the first direction in the same direction as the first receiving surface 22. More specifically, the second receiving surface 23 is disposed such that the second receiving surface 23 faces the second cam 63 of the developing cartridge 1 attached to each slot 2A of the drawer 2. The second receiving surface 23 contacts the second inclined surface 631 of the second cam 63 as illustrated in FIG. 14. The second receiving surface 23 is formed such that a distance between the second receiving surface 23 and the developing cartridge 1 in the second direction increases in the direction away from the first side frame 201 in the first direction (i.e., a direction from the first side frame 201 to the second side frame 202 in the first direction).

As will be described below in detail, when the separation member 60 of the developing cartridge 1 attached to each slot 2A moves in the first direction, each of the first receiving surface 22 and the second receiving surface 23 is configured to guide (move) the developing cartridge 1 in the second direction relative to the frame 200 while the first inclined surface 621 is in contact with the first receiving surface 22 and the second inclined surface 631 is in contact with the second receiving surface 23, respectively.

<1.4. Separation Movement by Separation Member 60>

Next, movement of the developing cartridge according to the present embodiment in the image forming apparatus 100 when the image forming apparatus 100 is switched between the contact state and the separation state will be described.

Figure 16A:
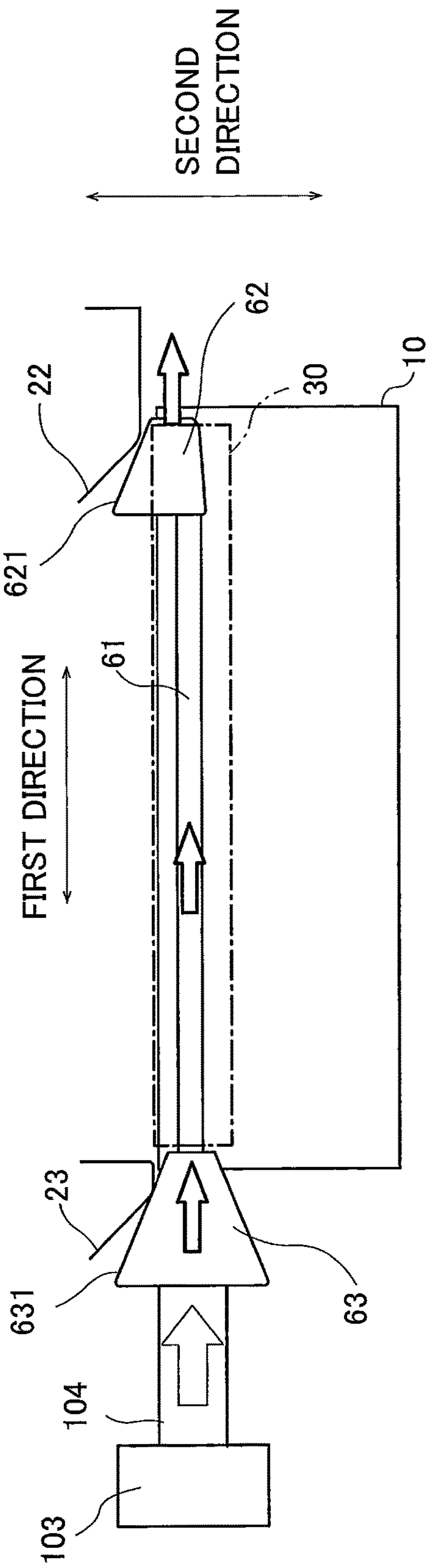
FIG. 16A is a view for description of separation movement of the developing cartridge according to the first embodiment performed by the separation member.
Figure 16B:
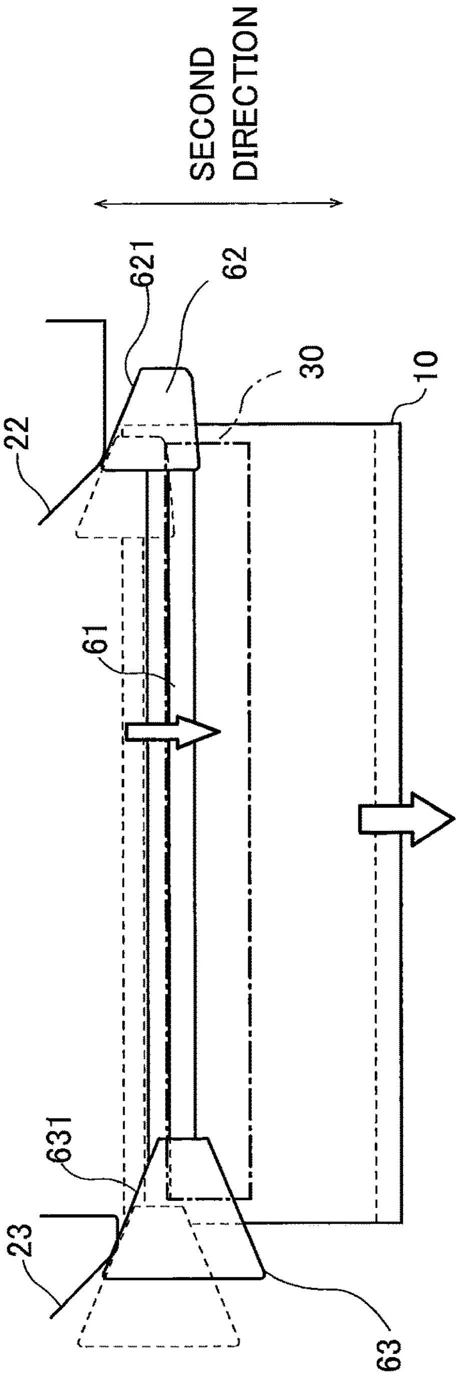
FIG. 16B is another view for description of separation movement of the developing cartridge according to the first embodiment performed by the separation member.
Figure 17:
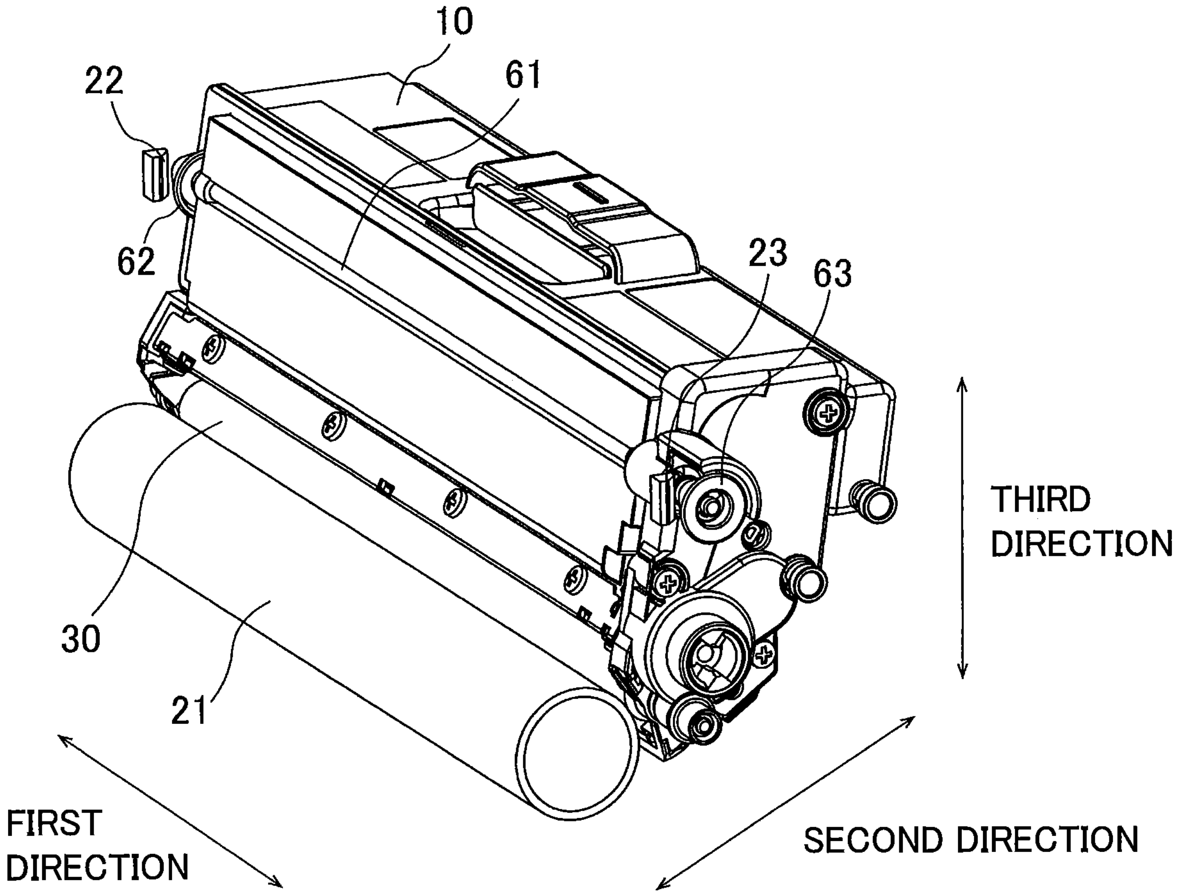
FIG. 17 is a perspective view of the developing cartridge according to the first embodiment and a photosensitive drum of the drawer in a contact state of the image forming apparatus.
Figure 18:
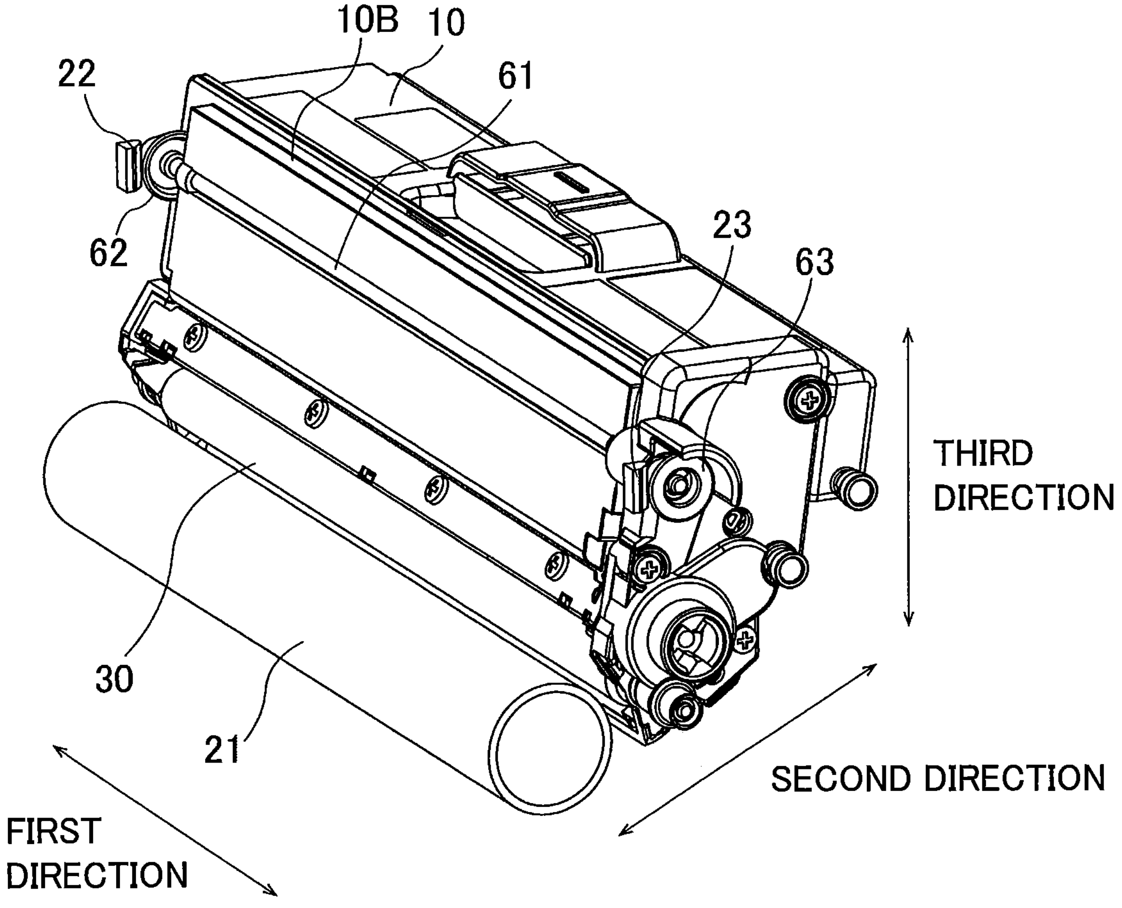
FIG. 18 is a perspective view of the developing cartridge according to the first embodiment and the photosensitive drum in a separation state of the image forming apparatus.

FIGS. 16A and 16B are views for description of separation movement of the developing cartridge 1 performed by the separation member 60. FIG. 16A illustrates the developing cartridge 1 in the contact state of the image forming apparatus 100. FIG. 16B illustrates the developing cartridge 1 in the separation state of the image forming apparatus 100. FIG. 17 is a perspective view of the developing cartridge 1 and the photosensitive drum 21, and illustrating a state where the developing roller 30 and the photosensitive drum 21 are in contact with each other. FIG. 18 is a perspective view of the developing cartridge 1 and the photosensitive drum 21, and illustrating a state where the developing roller 30 and the photosensitive drum 21 are separated from each other.

When each developing cartridge 1 is attached to the corresponding slot 2A of the drawer 2, the developing roller 30 of each developing cartridge 1 contacts the corresponding photosensitive drum 21, as illustrated in FIG. 17. That is, the image forming apparatus 100 is in the contact state. In this contact state of the image forming apparatus 100, as illustrated in FIG. 16A, the first inclined surface 621 of the first cam 62 is in contact with the first receiving surface 22, and the second inclined surface 631 of the second cam 63 is in contact with the second receiving surface 23. In other words, the first inclined surface 621 and the second inclined surface 631 engages the frame 200.

More precisely, at the time of attachment of the developing cartridge 1 to the drawer 2, the first inclined surface 621 is out of contact with the first receiving surface 22, and the second inclined surface 631 is out of contact with the second receiving surface 23. Then, as the developing cartridge 1 moves by a predetermined distance in the first direction, the first inclined surface 621 is brought into contact with the first receiving surface 22, and the second inclined surface 631 is brought into contact with the second receiving surface 23. Incidentally, the first inclined surface 621 may contact the first receiving surface 22 and the second inclined surface 631 may contact the second receiving surface 23 at the time of attachment of the developing cartridge 1 to the drawer 2.

The first inclined surface 621 extends radially outward of the shaft 61 in the direction from the first cam 62 toward the second cam 63 in the first direction. The first receiving surface 22 contacts a portion of the first inclined surface 621. A distance between the portion of the first inclined surface 621 and the shaft 61 in the radial direction of the shaft 61 is smaller than a distance between the remaining portion of the first inclined surface 621 and the shaft 61 in the radial direction of the shaft 61. Similarly, the second inclined surface 631 extends radially outward of the shaft 61 in the direction from the first cam 62 toward the second cam 63 in the first direction. The second receiving surface 23 contacts a portion of the second inclined surface 631. A distance between the portion of the second inclined surface 631 and the shaft 61 in the radial direction of the shaft 61 is smaller than a distance between the remaining portion of the second inclined surface 631 and the shaft 61 in the radial direction of the shaft 61.

As described above, each of the first cam 62 and the second cam 63 has a cone shape. Thus, even if the shaft 61 rotates about the second axis, the first inclined surface 621 and the second inclined surface 631 can reliably contact (engage) the first receiving surface 22 and the second receiving surface 23, respectively.

The image forming apparatus 100 includes a driving unit 103 and a pressing member 104. The driving unit 103 is configured to move the pressing member 104 in the first direction. The driving unit 103 is, for example, a motor. The pressing member 104 has a circular columnar shape or a rectangular columnar shape and extends in the first direction. The pressing member 104 is movable in the first direction between a contact position and a non-contact position through the second recessed portion 202A formed in the second side frame 202 to apply the pressing force from the outside of the frame 200 to the second cam 63. The pressing member 104 in the contact position contacts the second cam 63 of the developing cartridge 1 attached to slot 2A of the drawer 2, while the pressing member 104 in the non-contact position does not contact the second cam 63.

In order to separate the developing roller 30 from the photosensitive drum 21, the driving unit 103 moves the pressing member 104 toward the direction from the second cam 63 to the first cam 62 in the first direction. Accordingly, the second cam 63 is pressed by the pressing member 104 toward the direction from the second cam 63 to the first cam 62 in the first direction. When the second cam 63 receives pressing force from the pressing member 104 through the second recessed portion 202A, the shaft 61, the first cam 62, and the second cam 63 move toward the direction from the second cam 63 to the first cam 62 in the first direction relative to the casing 10 and the developing roller 30.

In this instance, the first inclined surface 621 of the first cam 62 moves toward the direction from the second cam 63 to the first cam 62 in the first direction while maintaining contact with the first receiving surface 22. As described above, the first inclined surface 621 is formed so as to extend radially outward of the shaft 61 in the direction from the first cam 62 to the second cam 63. Therefore, when the first cam 62 moves toward the direction from the second cam 63 to the first cam 62 in the first direction, a portion of the first inclined surface 621 contacting the first receiving surface 22 recedes from the shaft 61 in the radial direction of the shaft 61. The first inclined surface 621 and the first receiving surface 22 face each other in the second direction. That is, when the first inclined surface 621 moves toward the direction from the second cam 63 to the first cam 62 in the first direction, the first inclined surface 621 also moves toward a direction away from the first receiving surface 22 in the second direction, as illustrated in FIG. 16B.

Similar to the first inclined surface 621, the second inclined surface 631 of the second cam 63 moves toward the direction from the second cam 63 to the first cam 62 in the first direction while contacting the second receiving surface 23. As described above, the second inclined surface 631 is formed such that the second inclined surface 631 extends radially outward of the shaft 61 in the direction from the first cam 62 to the second cam 63. Accordingly, when the second cam 63 moves toward the direction from the second cam 63 to the first cam 62 in the first direction, a portion of the second inclined surface 631 contacting the second receiving surface 23 comes away from the shaft 61 in the radial direction of the shaft 61. The second inclined surface 631 and the second receiving surface 23 face each other in the second direction. That is, when the second inclined surface 631 moves toward the direction from the second cam 63 to the first cam 62 in the first direction, the second inclined surface 631 also moves toward a direction away from the second receiving surface 23 in the second direction, as illustrated in FIG. 16B.

As the first cam 62 and the second cam 63 move in the second direction while moving in the first direction, the shaft 61 also moves in the same manner. When the shaft 61, the first cam 62, and the second cam 63 move in the second direction, the casing 10 and the developing roller 30 also move in the second direction, as illustrated in FIG. 16B. In other words, the first cam 62 and the second cam 63 are movable together with the casing 10 and the developing roller 30 in a direction non-parallel with the second axis in response to the axial movement of the shaft 61 along the second axis. Further in other words, each of the first inclined surface 621 and the second inclined surface 631 provides a camming movement in response to the axial movement of the shaft 61 along the second axis. This movement causes the developing roller 30 to be separated from the photosensitive drum 21 in the second direction against the urging force of the conventional urging member (not illustrated) provided in the drawer 2, as illustrated in FIG. 18. Accordingly, the image forming apparatus 100 is brought into the separation state.

The movement of the shaft 61, the first cam 62, and the second cam 63 in the first direction cause expansion and contraction of the coil spring 64 in the first direction. As described above, the coil spring 64 has the first length when the shaft 61 is positioned at the first position, as illustrated in FIG. 8. To the contrary, the coil spring 64 has the second length shorter than the first length when the shaft 61 is positioned at the second position, as illustrated in FIG. 9. The coil spring 64 is compressed from the first length to the second length due to the pressing force of the pressing member 104, and extends from the second length to the first length when the pressing force acting on the separation member 60 by the pressing member 104 is released.

When the shaft 61 moves back from the second position to the first position together with the first cam 62 and the second cam 63, a portion of the first inclined surface 621 contacting the first receiving surface 22 approaches the shaft 61 in the second direction due to mechanism which is reverse of the mechanism described above. Similarly, a portion of the second inclined surface 631 contacting the second receiving surface 23 approaches the shaft 61 in the second direction. These movements of the shaft 61, the first cam 62, and the second cam 63 cause the casing 10 and the developing roller 30 to move in the second direction, thereby allowing the developing roller 30 to approach the photosensitive drum 21 in the second direction. As a result, the outer circumferential surface of the developing roller 30 comes into contact with the outer circumferential surface of the photosensitive drum 21 due to the urging force of the conventional urging member (not illustrated) provided in the drawer 2. Thus, the image forming apparatus 100 is brought into the contact state.

<1.5. Advantageous Effects of First Embodiment>

In the present embodiment, the first cam 62 and the second cam 63 are disposed at both ends of the shaft 61 in the first direction, respectively. This configuration can prevent one of ends of the casing 10 and the developing roller 30 in the first direction from being inclined while the image forming apparatus 100 is switched between the separation state and the contact state in comparison with a case where only one of the first cam 62 and the second cam 63 is disposed at the shaft 61.

As described above, the pressing force directed in the first direction causes the shaft 61 to move in the first direction relative to the casing 10 and the developing roller 30. When the first inclined surface 621 contacts the first receiving surface 22 due to the movement of the shaft 61 in the first direction, the first inclined surface 621 moves in the second direction along the first receiving surface 22. The casing 10 and the developing roller 30 also move in the second direction in accordance with the movement of the first inclined surface 621 in the second direction. With this configuration, the developing cartridge 1 is movable in the second direction by the driving force directed in the first direction, not by driving force acting on both ends of the developing cartridge 1. In addition, the developing cartridge 1 has the first inclined surface 621 and the shaft 61. Thus, compared to a case where the drum cartridge includes a shaft, the shaft 61 does not interrupt attachment of the developing cartridge 1 to the slot 2A and detachment of the developing cartridge 1 from the slot 2A.

Further, when the shaft 61 is to move in the first direction, the driving force from both ends of the shaft 61 in the first direction is not required. That is, the developing cartridge 1 is movable due to the driving force applied from one end of the shaft 61 in the first direction.

In the present embodiment, the image forming apparatus 100 further includes a driving source disposed at one side the main frame 101 at which one end of the developing cartridge 1 and the drawer 2 in the first direction is positioned. The driving source is configured to drive the developing roller 30 and the photosensitive drum 21 to rotate. The driving unit 103, that serves as a driving source used to move the pressing member 104 in the first direction, can be disposed in the vicinity of the driving source. With this arrangement, the driving sources of the image forming apparatus 100 (i.e., the driving unit 103 and the driving source for driving the developing roller 30 and the photosensitive drum 21) can be collectively arranged on one side of the developing cartridge 1 and the drawer 2. Accordingly, downsizing of the image forming apparatus 100 can be realized. Further, since the components for moving the developing cartridge 1 need not be disposed on both ends of the drawer 2 in the first direction, the configuration of the drawer 2 can be simplified, and the drawer 2 can be downsized.

2. Second Embodiment

Next, a developing cartridge 1 according to a second embodiment will be described with reference to FIGS. 19 through 20B, wherein like parts and components are designated with the same reference numerals as those shown in the first embodiment to avoid duplicating description.

In the first embodiment, each of the first inclined surface 621 and the second inclined surface 631 is inclined relative to the first direction at a constant angle. To the contrary, in the second embodiment, each of the first inclined surface 621 and the second inclined surface 631 has at least two inclined surfaces defining different angles. Hereinafter, different points of the second embodiment from the first embodiment will be described.

Figure 19:
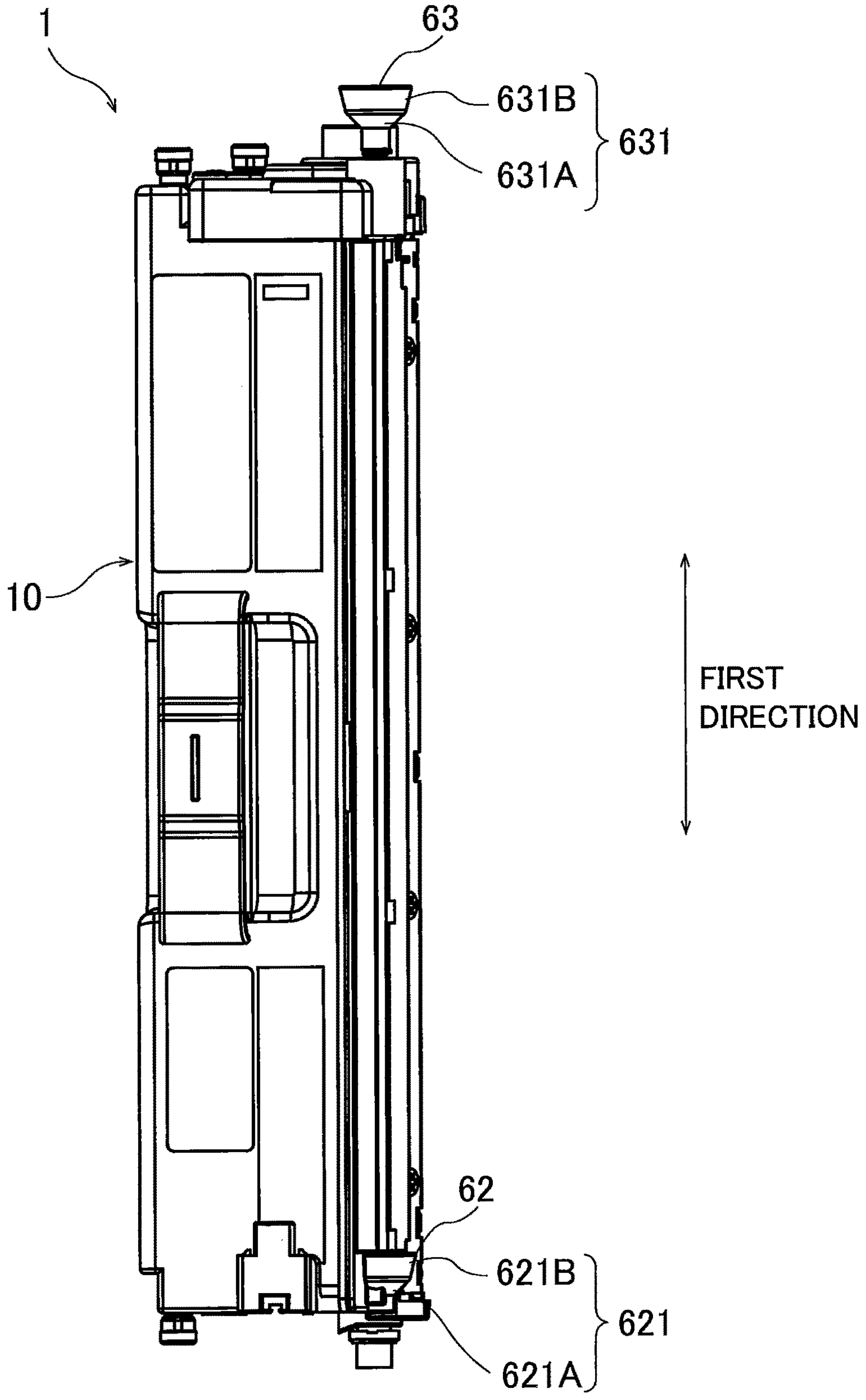
FIG. 19 is a plan view of a developing cartridge according to a second embodiment of the present disclosure as viewed in the third direction.

FIG. 19 is a plan view of the developing cartridge 1 according to the second embodiment as viewed in the third direction.

The first inclined surface 621 of the first cam 62 has a sloped surface 621A and a sloped surface 621B. The sloped surface 621A and the sloped surface 621B are arrayed with each other in the first direction. The sloped surface 621A is positioned farther from the second cam 63 than the sloped surface 621B is from the second cam 63 in the first direction. Further, the sloped surface 621A provides an inclination relative to the first direction steeper than an inclination of the sloped surface 621B relative to the first direction. Specifically, the sloped surface 621A is inclined relative to the first direction to define an acute angle between the sloped surface 621A and the first direction; the sloped surface 621B is also inclined relative to the first direction to define an acute angle between the sloped surface 621B and the first direction; and an angle between the sloped surface 621A and the first direction is greater than an angle between the sloped surface 621B and the first direction.

The angle between the sloped surface 621A and the first direction is greater than or equal to 43 degrees and smaller than or equal to 47 degrees. More preferably, the angle between the sloped surface 621A and the first direction is 45 degrees. The angle between the sloped surface 621B and the first direction is greater than or equal to 12 degrees and smaller than or equal to 17 degrees. Preferably, the angle between the sloped surface 621B and the first direction is greater than or equal to 14 degrees and smaller than or equal to 15 degrees. More preferably, the angle between the sloped surface 621B and the first direction is 14 degrees or 15 degrees.

The ratio of a length of the sloped surface 621A in the first direction to a length of the sloped surface 621A in the radial direction of the shaft 61 (i.e., the second direction) is, for example, 1:1 (one to one). Further, the ratio of a length of the sloped surface 621B in the first direction to a length of the sloped surface 621B in the radial direction of the shaft 61 (i.e., the second direction) is, for example, 4:1 (four to one).

The second inclined surface 631 of the second cam 63 has a sloped surface 631A and a sloped surface 631B. The sloped surface 631A and the sloped surface 631B are arrayed with each other in the first direction. The sloped surface 631A is positioned closer to the first cam 62 (i.e., the first inclined surface 621) than the sloped surface 631B is to the first cam 62 (i.e., the first inclined surface 621) in the first direction. Further, the sloped surface 631A provides an inclination relative to the first direction steeper than an inclination of the sloped surface 631B relative to the first direction. Specifically, the sloped surface 631A is inclined relative to the first direction to define an acute angle between the sloped surface 631A and the first direction; the sloped surface 631B is also inclined relative to the first direction to define an acute angle between the sloped surface 631B and the first direction; and an angle between the sloped surface 631A and the first direction is greater than an angle between the sloped surface 631B and the first direction.

The angle between the sloped surface 631A and the first direction is greater than or equal to 43 degrees and smaller than or equal to 47 degrees. More preferably, the angle between the sloped surface 631A and the first direction is 45 degrees. The angle between the sloped surface 631B and the first direction is greater than or equal to 12 degrees and smaller than or equal to 17 degrees. Preferably, the angle between the sloped surface 631B and the first direction is greater than or equal to 14 degrees and smaller than or equal to 15 degrees. More preferably, the angle between the sloped surface 631B and the first direction is 14 degrees or 15 degrees.

The ratio of a length of the sloped surface 631A in the first direction to a length of the sloped surface 631A in the radial direction of the shaft 61 (i.e., the second direction) is, for example, 1:1 (one to one). The ratio of a length of the sloped surface 631B in the first direction to a length of the sloped surface 631B in the radial direction of the shaft 61 (i.e., the second direction) is, for example, 4:1 (four to one).

It is preferable that the sloped surface 621A and the sloped surface 631A are inclined relative to the first direction so as to define angles the same as each other. Further, it is also preferable that the sloped surface 621B and the sloped surface 631B are inclined relative to the first direction so as to define angles the same as each other.

<2.1. Separation Movement by Separation Member 60>

Movement of the developing cartridge 1 according to the second embodiment in the image forming apparatus 100 when the image forming apparatus 100 is switched between the contact state and the separation state will next be described.

Figure 20A:
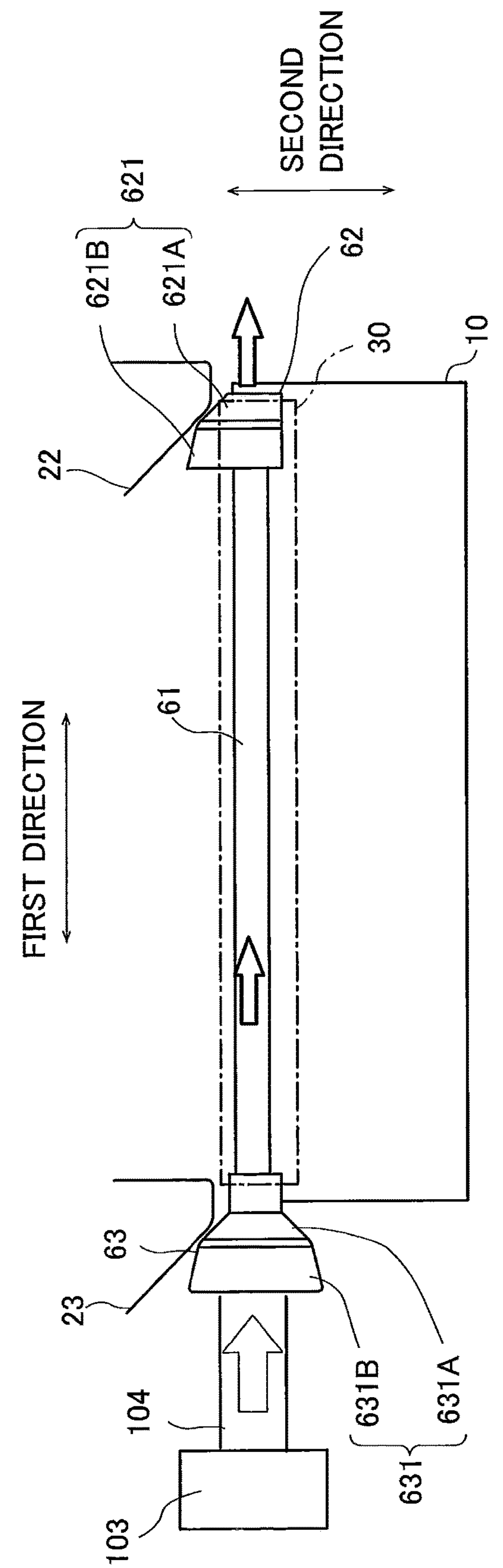
FIG. 20A is a view for description of separation movement of the developing cartridge according to the second embodiment performed by the separation member.
Figure 20B:
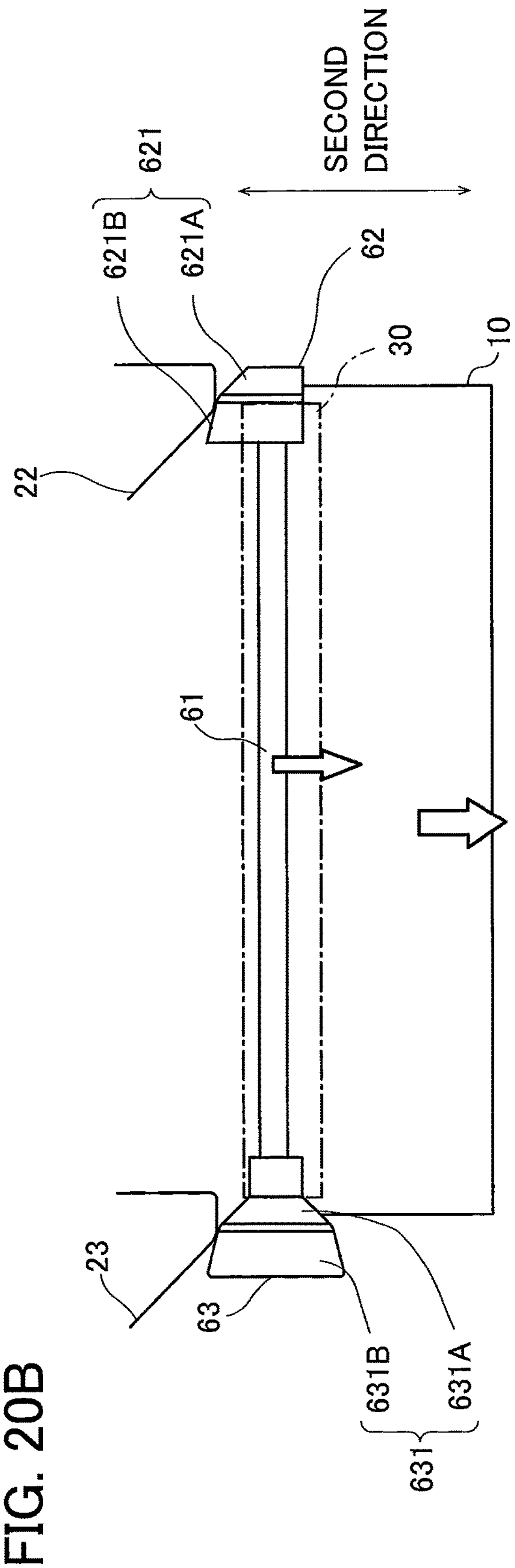
FIG. 20B is another view for description of separation movement of the developing cartridge according to the second embodiment performed by the separation member.

FIGS. 20A and 20B are views for description of separation movement of the developing cartridge 1 performed by the separation member 60. FIG. 20A illustrates the developing cartridge 1 in the contact state of the image forming apparatus 100. FIG. 20B illustrates the developing cartridge 1 in the separation state of the image forming apparatus 100.

In the contact state of the image forming apparatus 100 where the developing roller 30 of the developing cartridge 1 is in contact with the photosensitive drum 21, the sloped surface 621A of the first inclined surface 621 contacts the first receiving surface 22 and the sloped surface 631A of the second inclined surface 631 contacts the second receiving surface 23, as illustrated in FIG. 20A.

More precisely, at the time of attachment of the developing cartridge 1 to the drawer 2, the sloped surface 621A is separated from the first receiving surface 22, and the sloped surface 631A is separated from the second receiving surface 23. Then, as the developing cartridge 1 moves by a predetermined distance in the first direction, the sloped surface 621A is brought into contact with the first receiving surface 22, and the sloped surface 631A is brought into contact with the second receiving surface 23. Incidentally, the sloped surface 621A may contact the first receiving surface 22, and the sloped surface 631A may contact the second receiving surface 23 at the time of attachment of the developing cartridge 1 to the drawer 2.

When the second cam 63 is pressed by the pressing member 104 toward the first cam 62 in the first direction, the shaft 61, the first cam 62, and the second cam 63 move in the first direction relative to the casing 10 and the developing roller 30. At this time, the sloped surface 621A of the first inclined surface 621 moves toward the direction from the second cam 63 to the first cam 62 in the first direction while contacting the first receiving surface 22. In addition, the sloped surface 631A of the second inclined surface 631 moves toward the direction from the second cam 63 to the first cam 62 in the first direction while contacting the second receiving surface 23. Thus, the first inclined surface 621 also moves toward the direction away from the first receiving surface 22 in the second direction, as illustrated in FIG. 20B. In addition, the second inclined surface 631 also moves in the direction away from the second receiving surface 23 in the second direction, as illustrated in FIG. 20B. Through this movement, the developing roller 30 moves away from the photosensitive drum 21 in the second direction (see FIG. 18).

When the shaft 61, the first cam 62 and the second cam 63 further move toward the direction from the second cam 63 to the first cam 62 in the first direction, the sloped surface 621B of the first inclined surface 621 contacts the first receiving surface 22 to move toward the direction from the second cam 63 to the first cam 62 in the first direction along the first receiving surface 22. Further, the sloped surface 631B of the second inclined surface 631 contacts the second receiving surface 23 to move toward the direction from the second cam 63 to the first cam 62 in the first direction along the second receiving surface 23.

When the shaft 61 moves back from the second position to the first position together with the first cam 62 and the second cam 63, a portion of the first inclined surface 621 contacting the first receiving surface 22 approaches the shaft 61 in the second direction due to mechanism which is reverse of the mechanism described above. Similarly, a portion of the second inclined surface 631 contacting the second receiving surface 23 approaches the shaft 61 in the second direction. Accordingly, the casing 10 and the developing roller 30 move in the second direction so that the developing roller 30 approaches the photosensitive drum 21 in the second direction. Thus, the image forming apparatus 100 is brought into the contact state.

<2.2. Advantageous Effects of Second Embodiment>

As described above, the pressing force from the pressing member 104 causes the shaft 61 to move in the first direction relative to the casing 10 and the developing roller 30. When the first inclined surface 621 contacts the first receiving surface 22 due to the movement of the shaft 61 in the first direction, the first inclined surface 621 moves in the second direction along the first receiving surface 22. The casing 10 and the developing roller 30 also move in the second direction, in accordance with the movement of the first inclined surface 621 in the second direction. With this configuration, the developing cartridge 1 is movable in the second direction by the driving force directed in the first direction, not by driving force acting on both ends of the developing cartridge 1. In addition, the developing cartridge 1 has the first inclined surface 621 and the shaft 61. Thus, compared to a case where the drum cartridge includes a shaft, the shaft 61 does not interrupt attachment of the developing cartridge 1 to the slot 2A and detachment of the developing cartridge 1 from the slot 2A.

Further, when the shaft 61 is to move in the first direction, the driving force from both ends of the shaft 61 in the first direction is not required. That is, the developing cartridge 1 is movable due to the driving force applied from one end of the shaft 61 in the first direction.

Also in the second embodiment, the image forming apparatus 100 further includes a driving source disposed at one side the main frame 101 at which one end of the developing cartridge 1 and the drawer 2 in the first direction is positioned. The driving source is configured to drive the developing roller 30 and the photosensitive drum 21 to rotate. The driving unit 103, that serves as a driving source used to move the pressing member 104 in the first direction, can be disposed in the vicinity of the driving source. With this arrangement, the driving sources of the image forming apparatus 100 (i.e., the driving unit 103 and the driving source for driving the developing roller 30 and the photosensitive drum 21) can be collectively arranged on one side of the developing cartridge 1 and the drawer 2. Accordingly, downsizing of the image forming apparatus 100 can be realized. Further, since the components for moving the developing cartridge 1 need not be disposed on both ends of the drawer 2 in the first direction, the configuration of the drawer 2 can be simplified, and the drawer 2 can be downsized.

The sloped surface 621A of the first inclined surface 621 that first contacts the first receiving surface 22 during the movement of the first cam 62 toward the direction from the second cam 63 to the first cam 62 in the first direction is steeper than the sloped surface 621B. Similarly, the sloped surface 631A of the second inclined surface 631 that first contacts the second receiving surface 23 during the movement of the second cam 63 toward the direction from the second cam 63 to the first cam 62 in the first direction is steeper than the sloped surface 631B. With this configuration, in the beginning of the movement of the separation member 60 in the first direction, the amount of movement of the separation member 60 in the second direction can be increased. Thus, the developing roller 30 can be separated from the photosensitive drum 21 while reducing amount of movement of the separation member 60 in the first direction.

Further, the sloped surface 621B whose inclination relative to the first direction is smaller than the sloped surface 621A contacts the first receiving surface 22, and the sloped surface 631B whose inclination relative to the first direction is smaller than the sloped surface 631A contacts the second receiving surface 23. Accordingly, the separation member 60 can move in the first direction with less amount of movement in the second direction. This configuration can reduce driving load of the pressing member 104.

3. Third Embodiment

<3.1. Developing Cartridge>

Next, a developing cartridge 1 according to a third embodiment will be described with reference to FIGS. 21 through 25, wherein like parts and components are designated with the same reference numerals as those shown in the first and second embodiments to avoid duplicating description. The developing cartridge 1 according to the third embodiment differs from the developing cartridges 1 in the first and second embodiments in that the shape of the casing 10 and the separation member 60 are different from those of in the first and second embodiments.

Figure 21:
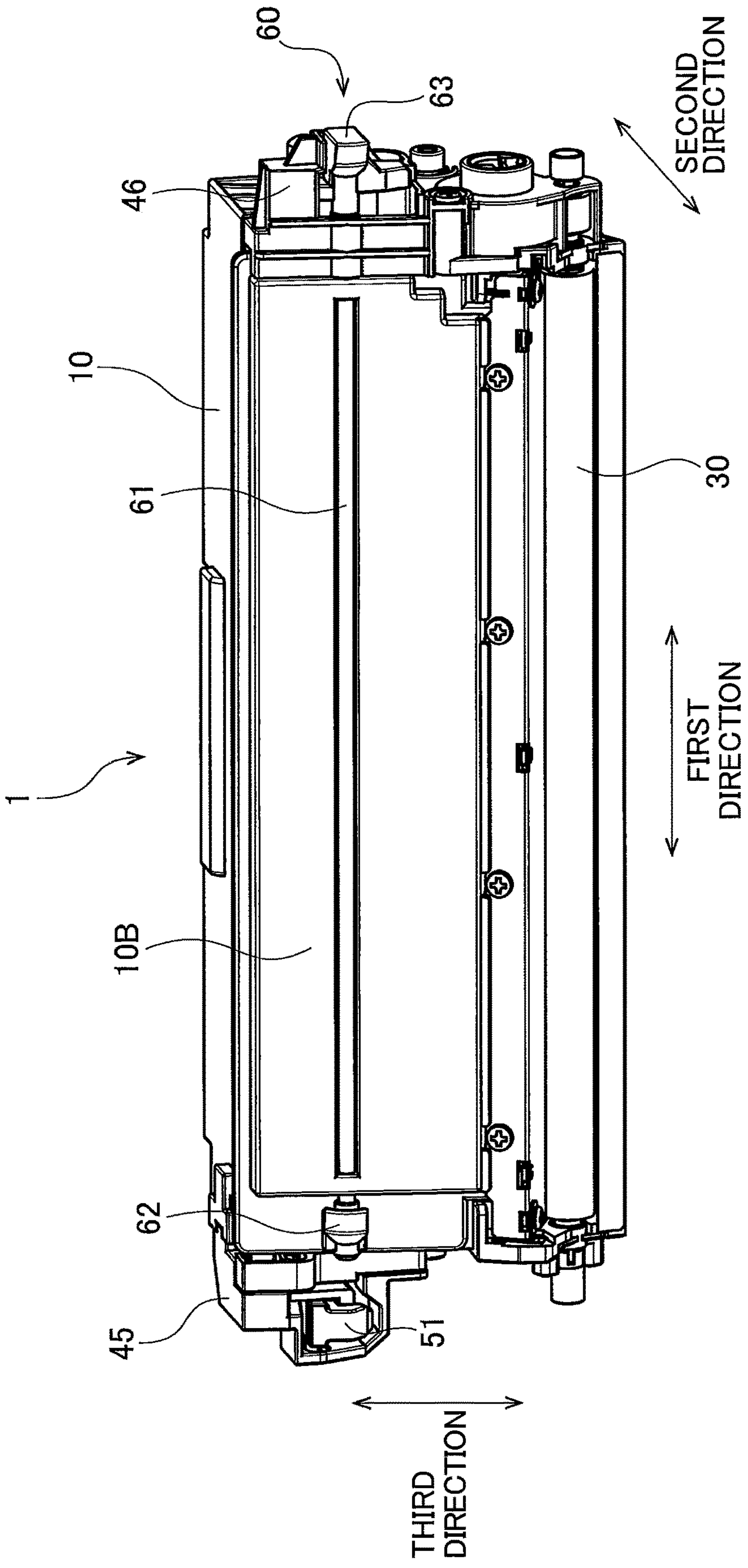
FIG. 21 is a perspective view of a developing cartridge according to a third embodiment of the present disclosure.
Figure 22:
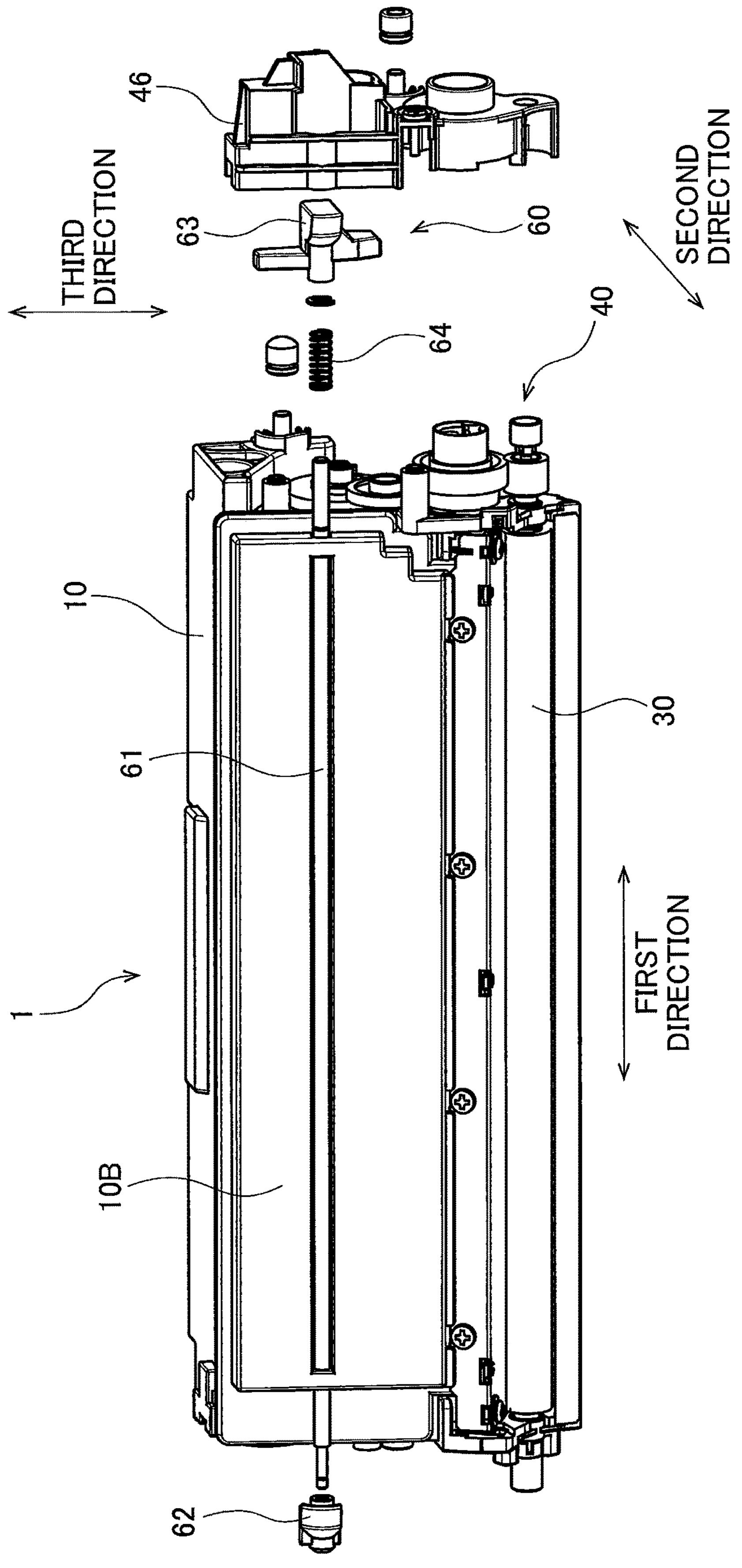
FIG. 22 is a perspective view of the developing cartridge according to the third embodiment in which a portion of the developing cartridge is exploded.

FIG. 21 is a perspective view of the developing cartridge 1 according to the third embodiment. FIG. 22 is a perspective view of the developing cartridge 1 according to the third embodiment in which a portion of the developing cartridge 1 is exploded. As illustrated in FIGS. 21 and 22, the casing 10 of the developing cartridge 1 in the present embodiment includes a first cover 45 and a second cover 46. The first cover 45 is positioned at one end in the first direction of the casing 10, while the second cover 46 is positioned at another end in the first direction of the casing 10. The first cover 45 holds the IC chip 51. The second cover 46 covers a plurality of gears of the gear portion 40.

The developing cartridge 1 according to the present embodiment also includes the separation member 60. The separation member 60 is a member for switching a state of the image forming apparatus 100 between the contact state and the separation state. The separation member 60 is disposed at the lid 10B of the developing cartridge 1. The separation member 60 is movable in the first direction relative to the casing 10 and the developing roller 30. In addition, the separation member 60 is movable in the second direction together with the casing 10 and the developing roller 30.

As illustrated in FIGS. 21 and 22, the separation member 60 includes a shaft 61, a first cam 62, a second cam 63, and a coil spring 64 as an example of an elastic member. Since the configuration of the shaft 61 is the same as that in the first and second embodiments, description as to the shaft 61 will be omitted.

Figure 23:
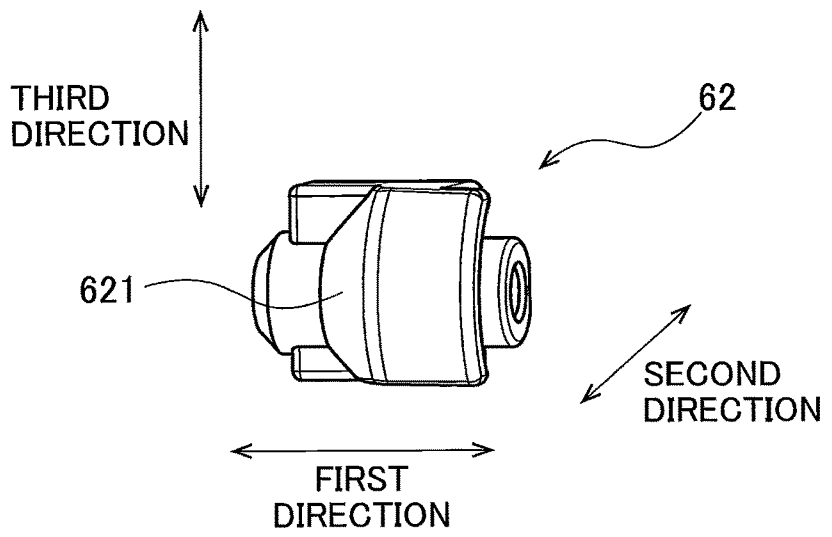
FIG. 23 is a perspective view of a first cam of the developing cartridge according to the third embodiment.

The first cam 62 is positioned at the one end in the first direction of the shaft 61. FIG. 23 is a perspective view of the first cam 62. As illustrated in FIG. 23, the first cam 61 has a first inclined surface 621 inclined relative to the shaft 61 that extends in the first direction. The first inclined surface 621 is positioned at only a portion of the peripheral surface of the shaft 61. In other words, the first inclined surface 621 is provided at only a portion of the peripheral surface in the circumferential direction of the shaft 61, not the entire portion of the peripheral surface of the shaft 61 centered on the axis of the shaft 61 (i.e., the second axis). With this configuration, a portion of the first cam 62 other than the first inclined surface 621 can be restrained from protruding outward. More specifically, a back surface of the first cam 62 (that is, a surface of the first cam 62 that faces the lid 10B and the first cover 45) can be a flat surface. As a result, a space for positioning the first cover 45 that holds the IC chip 51 can be made larger.

Figure 24:
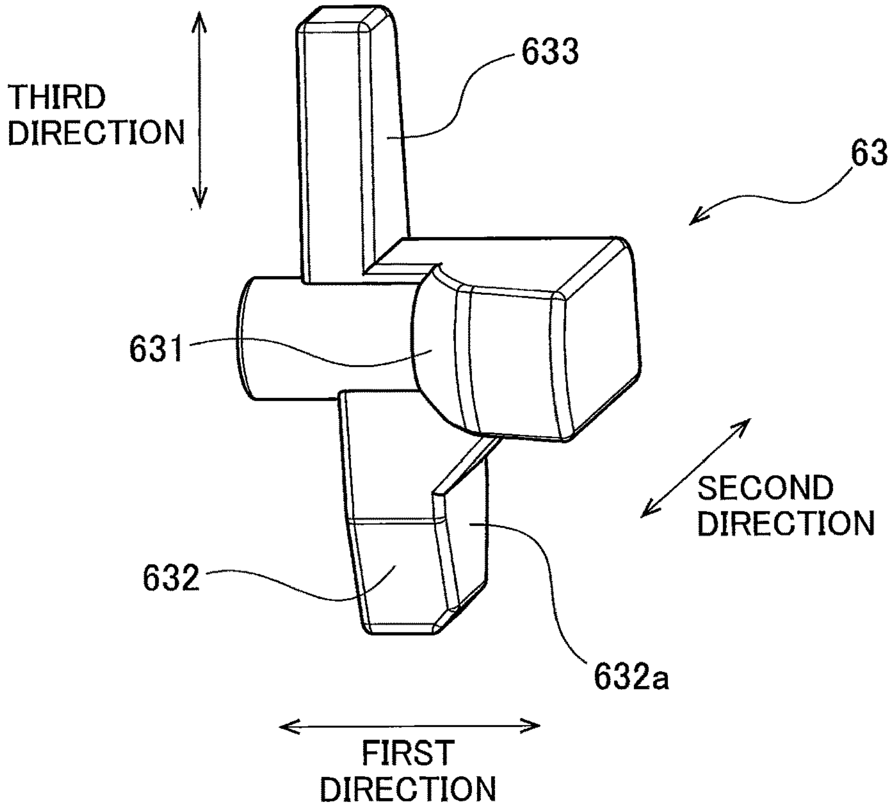
FIG. 24 is a perspective view of a second cam of the developing cartridge according to the third embodiment.

The second cam 63 is positioned at the other end in the first direction of the shaft 61. FIG. 24 is a perspective view of the second cam 63. As illustrated in FIG. 24, the second cam 63 has a second inclined surface 631 inclined relative to the shaft 61 extending in the first direction. The second inclined surface 631 is positioned at only a portion of the peripheral surface of the shaft 61. In other words, the second inclined surface 631 is positioned at only a portion of the peripheral surface in the circumferential direction of the shaft 61, but not the entire portion of the peripheral surface of the shaft 61 centered on the axis of the shaft 61 (i.e., the second axis). This configuration can suppress a portion of the second cam 63 other than the second inclined surface 631 from protruding outward. Specifically, a back surface of the second cam 63 (that is, a surface of the second cam 63 that faces the lid 10B and the second cover 46) can be a flat surface. In this way, a space for positioning the second cover 46 that accommodates the plurality of gears of the gear portion 40 can be made larger.

Further, in the present embodiment, the second cam 63 includes a first protrusion 632 and a second protrusion 633.

The first protrusion 632 extends from the axis of the shaft 61 (i.e., the second axis) radially outward and in the third direction toward the developing roller 30. The first protrusion 632 is positioned closer to the developing roller 30 than the second inclined surface 631 is to the developing roller 30. However, the first protrusion 632 may extend in a direction different from the direction described above. The first protrusion 632 is movable in the first direction together with the second inclined surface 631 relative to the casing 10.

Figure 25:
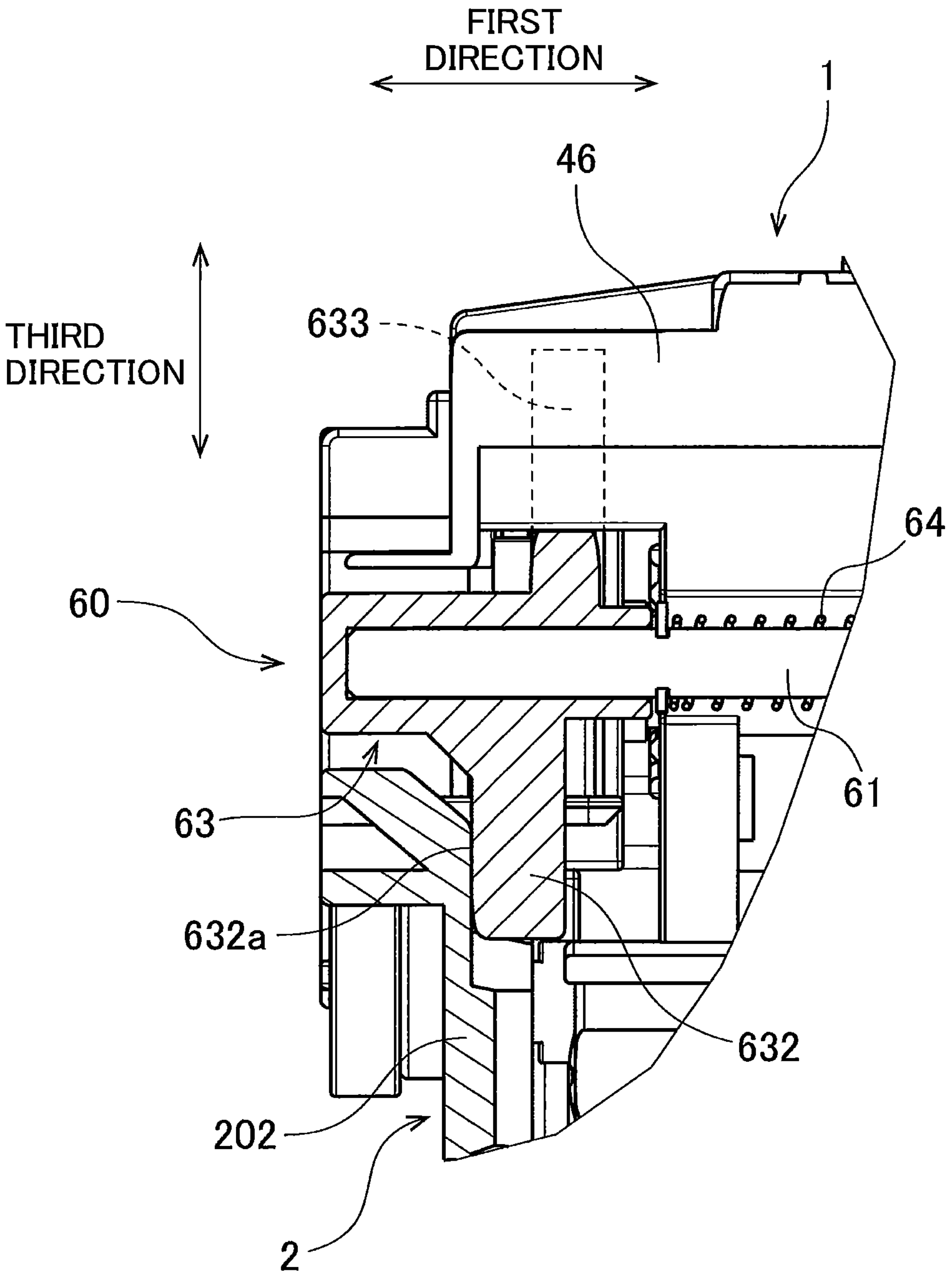
FIG. 25 is a cross-sectional view illustrating a portion in the vicinity of the second cam of the developing cartridge according to the third embodiment.

The first protrusion 632 has a positioning surface 632*a*. The positioning surface 632*a* is a surface of the first protrusion 632 that faces in the first direction. FIG. 25 is a cross-sectional view of a portion in the vicinity of the second cam 63 in a state in which the developing cartridge 1 is attached to the drawer 2. As illustrated in FIG. 25, in a state where the developing cartridge 1 to the drawer 2, the positioning surface 632*a* is in contact with an inner surface of the second side frame 202 of the drawer 2 in the first direction. This contact between the positioning surface 632*a* and the second side frame 202 causes the coil spring 64 to be slightly compressed in the first direction than that in a state prior to attachment of the developing cartridge 1 to the drawer 2. That is, by contacting the positioning surface 632*a* with the second side frame 202, the second cam 63 is positioned relative to the drawer 2 in the first direction.

Accordingly, the shaft 61 and the first cam 62 are also positioned relative to the drawer 2 in the first direction. As a result, the first inclined surface 621 and the second inclined surface 631 can be accurately positioned relative to the drawer 2 in the first direction, thereby suppressing deviation in positions in the first direction of the first inclined surface 621 and the second inclined surface 631 relative to the drawer 2.

The second protrusion 633 extends radially outward and away from the developing roller 30 from the axis of the shaft 61 (i.e., the second axis). The second protrusion 633 is positioned farther from the developing roller 30 than the second inclined surface 631 is from the developing roller 30. In other words, the second protrusion 633 is positioned opposite to the first protrusion 632 with respect to the second inclined surface 631. However, the second protrusion 633 may extend in a direction other than the direction described above.

The second protrusion 633 is movable in the first direction together with the second inclined surface 631 and the first protrusion 632 relative to the casing 10. Further, the second protrusion 633 is incapable of rotating relative to the second inclined surface 631 and the first protrusion 632.

A distal end portion of the second protrusion 633 is inserted into the second cover 46. In a case where the second cam 63 tries to rotate about the second axis, the distal end portion of the second protrusion 633 makes contact with an inner surface of the second cover 46. Consequently, rotation of the second cam 63 about the second axis is stopped, thereby causing rotation of the shaft 61 and the first cam 62 about the second axis to be also stopped. In this way, the second protrusion 633 can restrict the rotations of the shaft 61, the first cam 62, and the second cam 63 about the second axis. Therefore, the first inclined surface 621 and the second inclined surface 631 can reliably contact the frame 200 of the drawer 2 despite the fact that both the first inclined surface 621 and the second inclined surface 631 are positioned at only portions of the peripheral surface of the shaft 61.

<3.2. Drawer>

Different from the drawer 2 in the first and second embodiments, the drawer 2 according to the third embodiment includes first guide rollers 24 instead of the first receiving surfaces 22, and second guide rollers 25 instead of the second receiving surfaces 23. The differences between the drawer 2 in the third embodiment and the drawer 2 in the first and second embodiments will be only described while omitting the duplicating description as to the same components in the drawer 2 among the first to third embodiments. The drawer 2 is an example of a drum cartridge.

Figure 26:
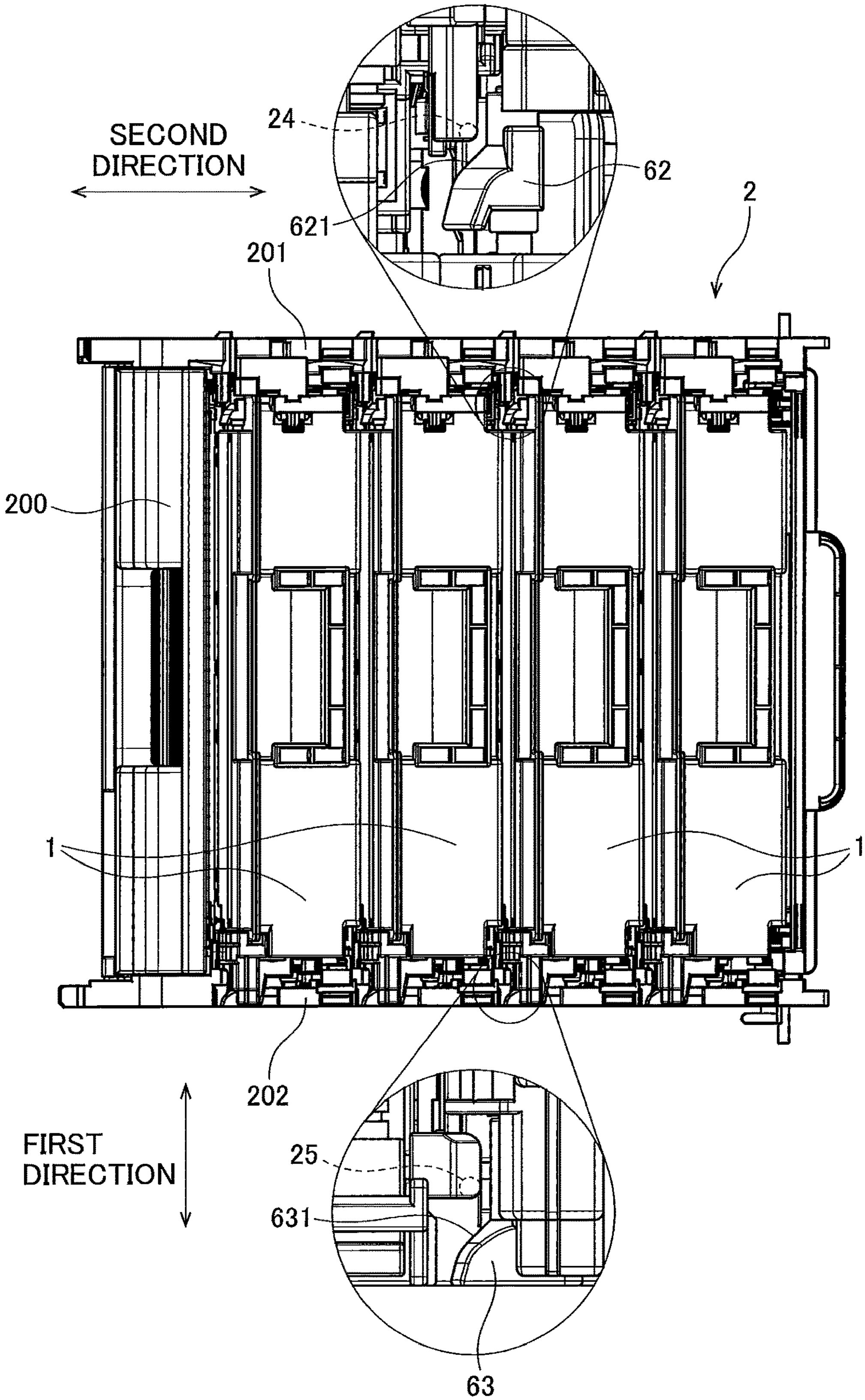
FIG. 26 is a plan view of the developing cartridge and a drawer according to the third embodiment.

FIG. 26 is a plan view of the drawer 2 to which the developing cartridges 1 are attached as viewed in the third direction. As illustrated in FIG. 26, the frame 200 of the drawer 2 includes a first side frame 201 and a second side frame 202. In a state where the developing cartridges 1 are attached to the drawer 2, the first outer surfaces 11 of the developing cartridges 1 face the first side frame 201 in the first direction, and the second outer surfaces 12 of the developing cartridges 1 face the second side frame 202 in the first direction.

As indicated by a broken line in an enlarged view in FIG. 26, the first side frame 201 includes the first guide rollers 24. That is, the first guide rollers 24 are positioned at the one end portion in the first direction of the frame 200. More specifically, of the surface of the first side frame 201 that faces the second side frame 202, each of the first guide rollers 24 is at a position where the first guide roller 24 faces the first cam 62 of the corresponding developing cartridge 1 attached to the slot 2A in the second direction.

Figure 27:
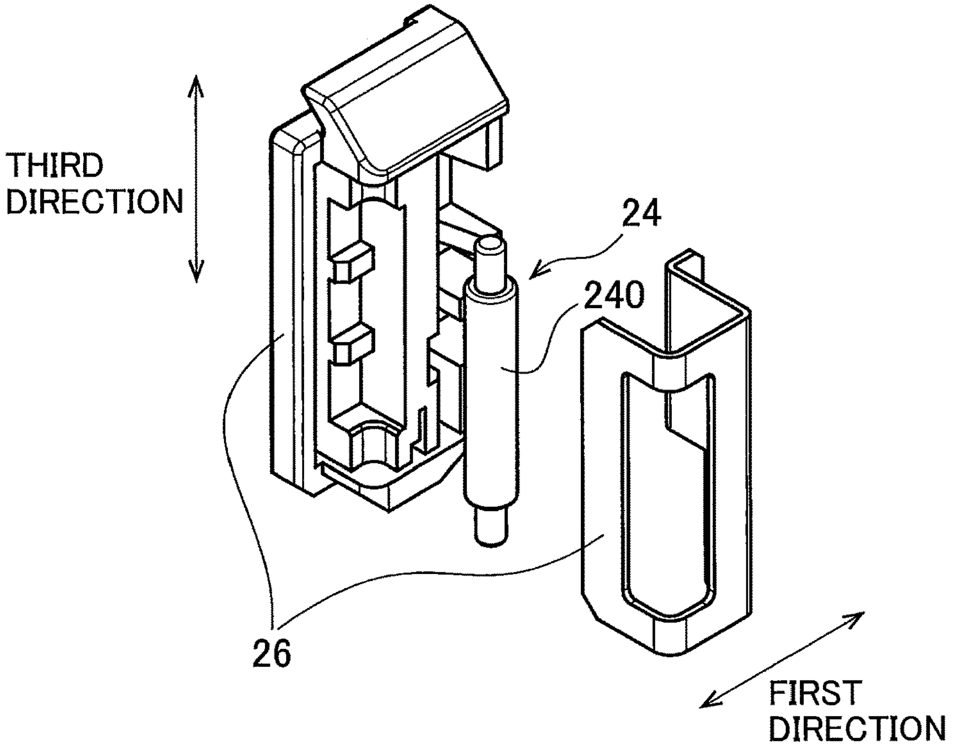
FIG. 27 is an exploded perspective view of a first guide roller and a bearing of the drawer according to the third embodiment.

FIG. 27 is an exploded perspective view of the first guide roller 24 and a bearing 26 that holds the first guide roller 24. As illustrated in FIG. 27, the first guide roller 24 has an outer circumferential surface 240. The outer circumferential surface 240 has a hollow cylindrical shape and extends in the third direction. Both end portions in the third direction of the first guide roller 24 are rotatably supported by the bearing 26. This configuration enables the first guide roller 24 to rotate about a center axis extending in the third direction.

As indicated by a broken line in another enlarged view in FIG. 26, the second side frame 202 includes the second guide rollers 25. In other words, the second guide rollers 25 are positioned at the other end portion in the first direction of the frame 200. Specifically, of the surface of the second side frame 202 that faces the first side frame 201, each of the second guide rollers 25 is at a position where the second guide roller 25 faces the second cam 63 of the corresponding developing cartridge 1 attached to the slot 2A in the second direction.

Figure 28:
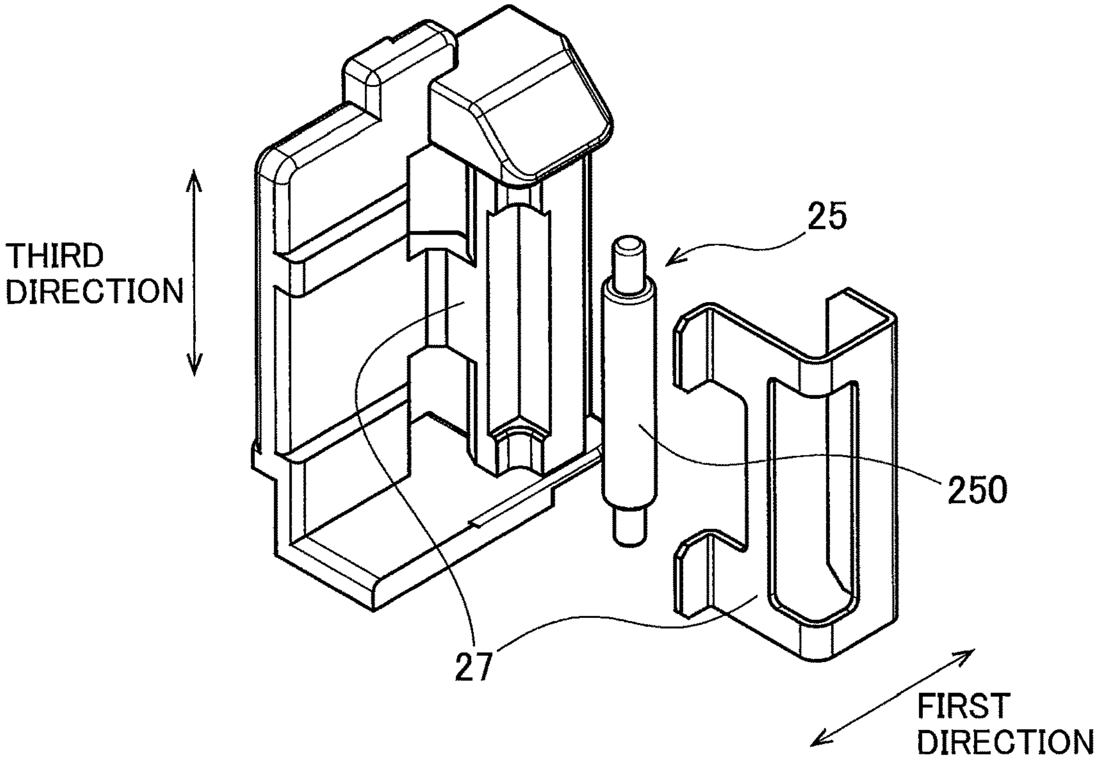
FIG. 28 is an exploded perspective view of a second guide roller and another bearing of the drawer according to the third embodiment.

FIG. 28 is an exploded perspective view of the second guide roller 25 and a bearing 27 that holds the second guide roller 25. As illustrated in FIG. 28, the second guide roller 25 has an outer circumferential surface 250 having a hollow cylindrical shape and extending in the third direction. The bearing 27 rotatably supports one end portion and another end portion in the third direction of the second guide roller 25. With this configuration, the second guide roller 25 is rotatable about a center axis extending in the third direction.

When the second cam 63 receives a pressing force directed in the first direction to move the separation member 60 in a direction from the second cam 63 toward the first cam 62, the first inclined surface 621 of the first cam 62 comes into contact with the first guide roller 24. Similarly, the second inclined surface 631 of the second cam 63 comes into contact with the second guide roller 25. The first cam 62 moves in the second direction due to guide of the first guide roller 24 while moving in the first direction. At the same time, while moving in the first direction, the second cam 63 is guided by the second guide roller 25 to also move in the second direction.

Here, the first guide roller 24 is configured to guide the first inclined surface 621 by rotating about the center axis extending in the third direction in a state where the first guide roller 24 is in contact with the first inclined surface 621. Further, the second guide roller 25 is configured to guide the second inclined surface 631 by rotating about the center axis extending in the third direction in a state where the second guide roller 25 is in contact with the second inclined surface 631. These rotations of the first guide roller 24 and the second guide roller 25 can decrease frictional resistance between the separation member 60 and the frame 200, whereby the separation member 60 can more smoothly move relative to the frame 200.

Note that it is preferable that the first guide roller 24 and the second guide roller 25 are made of metal. In a case where the first guide roller 24 and the second guide roller 25 are made of metal, abrasion of the first guide roller 24 and the second guide roller 25 caused by friction can be suppressed in comparison with a case where the first guide roller 24 and the second guide roller 25 are made of resin. Accordingly, the first guide roller 24 and the second guide roller 25 can more accurately guide the separation member 60.

4. Modification

While the description has been made in detail with reference to the embodiments, it would be apparent to those skilled in the art that various changes and modifications may be made thereto.

In the above-described embodiments, the separation member 60 includes the first cam 62 and the second cam 63. The separation member 60, however, may include at least one of the first cam 62 and the second cam 63. In addition, the separation member 60 may have at least one of the first inclined surface 621 and the second inclined surface 631. In other words, in a case where only the first cam 62 is provided, only the first inclined surface 621 is provided in the separation member 60. On the other hand, in a case where only the second cam 63 is provided, only the second inclined surface 631 is provided in the separation member 60. Alternatively, the first inclined surface 621 and the second inclined surface 631 may be formed without providing the first cam 62 and the second cam 63. For example, the first inclined surface 621 and the second inclined surface 631 may be formed by machining the shaft 61 so that the peripheral surfaces of the end portions of the shaft 61 are inclined relative to the first direction.

Although the coil spring 64 serves as an example of the elastic member in the above-described embodiments, the elastic member is not limited to the coil spring 64. For example, material having elasticity, such as a leaf spring, a torsion spring, a rubber, a sponge, or the like can be employed as the elastic member.

Further, various features appearing in the above-described embodiments and the modifications may be suitably combined together avoiding conflicting combination.

What is claimed is:

1. A developing cartridge comprising:

a casing configured to accommodate developer therein;

a developing roller rotatable about a first axis extending in a first direction;

a shaft extending along a second axis extending in the first direction, the shaft being movable in the first direction relative to the casing and the developing roller, the shaft having one end portion and another end portion in the first direction;

an inclined surface positioned at the another end portion in the first direction of the shaft and movable together with the shaft, the inclined surface extending radially outward of the shaft in a direction from the one end portion in the first direction of the shaft to the another end portion in the first direction of the shaft; and a first protrusion positioned at the another end portion in the first direction of the shaft, the first protrusion being movable in the first direction together with the inclined surface relative to the casing, the first protrusion being positioned closer to the developing roller than the inclined surface is to the developing roller, the first protrusion extending away from the shaft toward the developing roller, the first protrusion being positioned closer to the one end portion in the first direction of the shaft than the inclined surface is to the one end portion in the first direction of the shaft.

2. The developing cartridge according to claim 1, wherein the inclined surface is positioned at a portion of a peripheral surface of the shaft.

3. The developing cartridge according to claim 2, wherein the inclined surface is positioned at only the portion of the peripheral surface of the shaft.

4. The developing cartridge according to claim 1, wherein the first protrusion has a surface facing the first direction.

5. The developing cartridge according to claim 1, wherein the developing cartridge is for use with a drum cartridge, and wherein, when the developing cartridge is attached to the drum cartridge, the first protrusion is configured to position the developing cartridge relative to the drum cartridge in the first direction.

6. The developing cartridge according to claim 1, further comprising a second protrusion positioned at the another end portion in the first direction of the shaft and movable together with the inclined surface, the second protrusion being positioned opposite to the first protrusion with respect to the inclined surface, the second protrusion extending in a direction away from the developing roller, the second protrusion being positioned closer to the one end portion in the first direction of the shaft than the inclined surface is to the one end portion in the first direction of the shaft.

7. The developing cartridge according to claim 6, wherein the second protrusion is configured to contact a portion of the casing to stop rotation of the shaft.

8. The developing cartridge according to claim 1, further comprising an elastic member configured to expand and contract in the first direction, the elastic member having one end and another end in the first direction, the one end in the first direction of the elastic member being connected to the inclined surface, the another end in the first direction of the elastic member being connected to the casing.

9. The developing cartridge according to claim 1, wherein the shaft is movable from a first position to a second position in response to the inclined surface receiving a pressing force directed in a direction from the another end portion in the first direction of the shaft to the one end portion in the first direction of the shaft.

10. A developing cartridge comprising:

a casing configured to accommodate developer therein;

a developing roller rotatable about a first axis extending in a first direction;

a shaft extending along a second axis extending in the first direction, the shaft being movable in the first direction relative to the casing and the developing roller, the shaft having one end portion and another end portion in the first direction;

an inclined surface positioned at the another end portion in the first direction of the shaft and movable together with the shaft, the inclined surface extending radially outward of the shaft in a direction from the one end portion in the first direction of the shaft to the another end portion in the first direction of the shaft; and a protrusion positioned at the another end portion in the first direction of the shaft and movable together with the inclined surface, the protrusion extending in a direction away from the developing roller, the protrusion being positioned farther from the developing roller than the inclined surface is from the developing roller, the protrusion being positioned closer to the one end portion in the first direction of the shaft than the inclined surface is to the one end portion in the first direction of the shaft.

11. The developing cartridge according to claim 10, wherein the inclined surface is positioned at a portion of a peripheral surface of the shaft.

12. The developing cartridge according to claim 11, wherein the inclined surface is positioned at only the portion of the peripheral surface of the shaft.

13. The developing cartridge according to claim 10, wherein the protrusion is configured to contact a portion of the casing to stop rotation of the shaft.

14. The developing cartridge according to claim 13, further comprising a coupling, wherein the casing includes a cover covering a circumference of the coupling.

15. The developing cartridge according to claim 14, wherein the portion of the casing is the cover, and wherein a distal end of the protrusion is inserted into the cover.

16. The developing cartridge according to claim 10, further comprising an elastic member configured to expand and contract in the first direction, the elastic member having one end and another end in the first direction, the one end in the first direction of the elastic member being connected to the inclined surface, the another end in the first direction of the elastic member being connected to the casing.

17. The developing cartridge according to claim 10, wherein the shaft is movable from a first position to a second position in response to the inclined surface receiving a pressing force directed in a direction from the another end portion in the first direction of the shaft to the one end portion in the first direction of the shaft.

18. A developing cartridge comprising:

a casing configured to accommodate developer therein;

a developing roller rotatable about a first axis extending in a first direction;

a shaft extending along a second axis extending in the first direction, the shaft being movable in the first direction relative to the casing and the developing roller, the shaft having one end portion and another end portion in the first direction;

an inclined surface positioned at the another end portion in the first direction of the shaft and movable together with the shaft, the inclined surface being curved; and a first protrusion positioned at the another end portion in the first direction of the shaft, the first protrusion being movable in the first direction together with the inclined surface relative to the casing, the first protrusion being positioned closer to the developing roller than the inclined surface is to the developing roller, the first protrusion extending away from the shaft toward the developing roller, the first protrusion being positioned closer to the one end portion in the first direction of the shaft than the inclined surface is to the one end portion in the first direction of the shaft.

* * * * *